US012294505B2

(12) United States Patent
Sergeev et al.

(10) Patent No.: US 12,294,505 B2
(45) Date of Patent: May 6, 2025

(54) CELL-BASED ARCHITECTURE FOR AN EXTENSIBILITY PLATFORM

(71) Applicant: Cisco Technology, Inc., San Jose, CA (US)

(72) Inventors: Sergey Sergeev, Belmont, CA (US); Anna Igorevna Bokhan-Dilawari, San Ramon, CA (US); Geoffrey R. Hendrey, San Anselmo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/671,429

(22) Filed: May 22, 2024

(65) Prior Publication Data
US 2024/0314047 A1    Sep. 19, 2024

Related U.S. Application Data

(63) Continuation of application No. 18/129,448, filed on Mar. 31, 2023, now Pat. No. 12,009,997.

(60) Provisional application No. 63/326,237, filed on Mar. 31, 2022.

(51) Int. Cl.
  *G06F 16/20* (2019.01)
  *G06F 16/25* (2019.01)
  *H04L 41/5003* (2022.01)

(52) U.S. Cl.
  CPC ................. *H04L 41/5003* (2013.01)

(58) Field of Classification Search
  None
  See application file for complete search history.

(56) References Cited

U.S. PATENT DOCUMENTS

| 9,710,430 B2 | 7/2017 | Werner |
| 9,971,590 B2 | 5/2018 | Hoff et al. |
| 10,838,714 B2 | 11/2020 | Sanghvi et al. |
| 10,985,997 B2 | 4/2021 | Duggal et al. |

(Continued)

FOREIGN PATENT DOCUMENTS

CN    103699824 A    4/2014

OTHER PUBLICATIONS

Abeysinghe A., et al., "Cell-Based Architecture—a Decentralized Reference Architecture for Cloud-native Applications", winter 2022, pp. 1-28.

(Continued)

*Primary Examiner* — Christopher B Robinson
(74) *Attorney, Agent, or Firm* — BEHMKE INNOVATION GROUP LLC; James M. Behmke; James J. Wong

(57) ABSTRACT

According to one or more embodiments of the disclosure, an example method herein may comprise: managing a particular cell of a multi-celled architecture for an extensibility platform having one or more tenants served by datastores of the particular cell; connecting to a global cell manager for global cell management of all cells of the multi-celled architecture; identifying a consumption limit indicating a maximum amount of system resources that a particular tenant of the one or more tenants is allowed to consume of the particular cell; enforcing the consumption limit on the particular tenant; and ensuring that the particular tenant is provided system resources of the particular cell up to the consumption limit without limitation.

20 Claims, 37 Drawing Sheets

(56) References Cited

U.S. PATENT DOCUMENTS

| | | |
|---|---|---|
| 10,986,065 B1 | 4/2021 | Farhangi et al. |
| 11,126,635 B2 | 9/2021 | Behzadi et al. |
| 11,258,797 B2 | 2/2022 | Wilson et al. |
| 11,314,601 B1 | 4/2022 | Natanzon et al. |
| 11,321,196 B1 | 5/2022 | Kobayashi et al. |
| 11,507,363 B2 | 11/2022 | Totale et al. |
| 2005/0050141 A1 | 3/2005 | An et al. |
| 2005/0216720 A1* | 9/2005 | Michaelis ........... G06F 15/7867 713/2 |
| 2008/0288465 A1 | 11/2008 | Payton et al. |
| 2009/0177988 A1 | 7/2009 | Martins |
| 2009/0183185 A1 | 7/2009 | Srour et al. |
| 2010/0161648 A1 | 6/2010 | Eberlein et al. |
| 2011/0219354 A1 | 9/2011 | Zhang et al. |
| 2012/0084261 A1 | 4/2012 | Parab |
| 2012/0093047 A1* | 4/2012 | Khawer ............ H04W 72/1263 370/310 |
| 2012/0131646 A1 | 5/2012 | Chandolu et al. |
| 2012/0331518 A1 | 12/2012 | Lee |
| 2014/0172914 A1 | 6/2014 | Elnikety et al. |
| 2014/0237560 A1 | 8/2014 | Knjazihhin et al. |
| 2014/0289391 A1* | 9/2014 | Balaji ................... H04L 67/306 709/224 |
| 2015/0067641 A1 | 3/2015 | Nyisztor et al. |
| 2015/0254289 A1 | 9/2015 | Junkergard et al. |
| 2015/0296000 A1 | 10/2015 | Chandramouli et al. |
| 2015/0324391 A1 | 11/2015 | Werner |
| 2015/0379082 A1 | 12/2015 | Hu et al. |
| 2016/0092455 A1 | 3/2016 | Pedapudi et al. |
| 2016/0308982 A1 | 10/2016 | Greene |
| 2016/0352745 A1 | 12/2016 | Ilieva et al. |
| 2017/0046204 A1 | 2/2017 | Li |
| 2017/0091231 A1* | 3/2017 | DiFranco ................ G06F 16/93 |
| 2017/0118077 A1 | 4/2017 | Liu |
| 2017/0177305 A1 | 6/2017 | Charfi et al. |
| 2017/0255886 A1 | 9/2017 | Schmidt et al. |
| 2017/0336768 A1 | 11/2017 | Geffin |
| 2018/0173561 A1 | 6/2018 | Moroski et al. |
| 2018/0359201 A1 | 12/2018 | Rangasamy et al. |
| 2019/0079788 A1 | 3/2019 | Ruty et al. |
| 2019/0173765 A1* | 6/2019 | Bertran ................. H04L 41/147 |
| 2019/0205230 A1 | 7/2019 | Basham et al. |
| 2019/0306237 A1 | 10/2019 | Srinivasan et al. |
| 2019/0362087 A1 | 11/2019 | Ferrans et al. |
| 2020/0021615 A1 | 1/2020 | Wainner et al. |
| 2020/0052957 A1 | 2/2020 | Tubillara et al. |
| 2020/0053087 A1 | 2/2020 | Wilson et al. |
| 2020/0073896 A1 | 3/2020 | Nagaraj et al. |
| 2020/0073987 A1 | 3/2020 | Perumala et al. |
| 2020/0137097 A1 | 4/2020 | Zimmermann et al. |
| 2020/0192773 A1 | 6/2020 | Savino et al. |
| 2020/0250172 A1* | 8/2020 | Busjaeger ......... G06F 16/24552 |
| 2020/0274472 A1 | 8/2020 | Liu et al. |
| 2020/0349513 A1 | 11/2020 | Farah |
| 2021/0011765 A1 | 1/2021 | Doshi et al. |
| 2021/0042098 A1 | 2/2021 | Madisetti et al. |
| 2021/0360083 A1 | 11/2021 | Duggal et al. |
| 2022/0012045 A1 | 1/2022 | Rudraraju et al. |
| 2022/0035714 A1 | 2/2022 | Schultz et al. |
| 2022/0050597 A1* | 2/2022 | Kripalani .............. G06F 3/0608 |
| 2022/0171648 A1 | 6/2022 | Rodriguez et al. |
| 2022/0318060 A1 | 10/2022 | Choochotkaew et al. |

OTHER PUBLICATIONS

Lin J., et al., "A Multi-Dimensional Extensible Cloud-native Service Stack for Enterprises", Journal of Cloud Computing, 2022, vol. 11, No. 83, pp. 1-18.

Ma, et al., "Configuration-Driven Data Pipeline", accessed Feb. 27, 2023, pp. 1-7.

Miller J., "Flexible Meta Models and IBM Cognos Framework Manager", May 29, 2014, accessed Mar. 6, 2023, pp. 1-17.

Webinar—"Bring Extensibility into Your Data Pipelines with Snowflake", Snowflake, Jul. 9, 2020, 1 page.

Yan Y., et al., "Multi-SQL: An Extensible Multi-model Data Query Language", Harbin Institute of Technology, online: arXiv: 2011.08724v1, Nov. 17, 2020, 16 pages.

Zhou Y.H., et al., "DB2MMT: A Massive Multi-tenant Database Platform for Cloud Computing", 2011 Eighth IEEE International Conference on e-Business Engineering, IEEE Computer Society, Oct. 2011, pp. 335-340.

* cited by examiner

| Measurable Software Tech, Sorted and Grouped by Proximity to the End Customer |
|---|
| OUTCOMES<br>Payment/Revenue  Goods/Services Received  Inventory Updated  Dis/Satisfaction  Success/Failure  Support  Brand Capital |
| INTERACTIONS<br>Page views  Impressions  Gestures  Clicks  Voice Commands  Keystrokes  Downloads  Attention |
| EXPERIENCES<br>Sessions  App Usage  IoT Usage  Messaging/Notifications  Waiting/latency  Errors/Bugs |
| JOURNEYS<br>Business Journeys  Workflows |
| APP FLOWS<br>Business Transactions  Service Endpoints  Calls  Third Party "Backends" |
| APPLICATIONS<br>Application Services  APIs  Microservices  Scripts  Daemons  Deployments |
| INFRASTRUCTURE SERVICES<br>Databases  Virtual Machines  Containers  Orchestration  Meshes  Security Services  Logging |
| INFRASTRUCTURE<br>Servers  Networks  Storage  Compute  Datacenters  Loadbalancers |

FIG. 4

```
# For service instances, copy all matching attribute names to properties and remaining to
# tags (match by convention)
scopeFilter: containsAll(resourceAttributes, ["service.namespace", "service.name", "service.instance.id"])
fmmType: service.instance
```
⎫ 1210

```
# Copy all attributes starting with "service." to entity properties. Copy remaining to tags
scopeFilter: containsAll(resourceAttributes, ["service.namespace", "service.name", "service.instance.id"])
fmmType: service.instance
mappings:
 - to: attributes
   from: attributes.stream().filter (kv -> kv.getKey().startsWith("service."))
 - to: tags
   from: attributes.stream().filter(kv -> !kv.getKey().startsWith("service."))
```
⎫ 1220

```
#Define specific mappings for entity attribute and tags
scopeFilter: containsAll(resourceAttributes, ["service_name"])
fmmType: service
mappings:
 # Same mapping can be written concisely. See attributeNameMappings below.
 - to: attributes
   from: {"key": "service.name", "value": getValue(attributes, "service_name"))
 # Same mapping can be written concisely. See tagNameMappings below.
 - to: tags
   from: {"key": "business.unit", "value": getValue (attributes, "business_unit"))
   attributeNameMappings:
     service.name: service_name
   tagNameMappings:
     business.unit: business_unit
```
⎫ 1230

| Tenant 2202 | plan_size 2204 | Query 2206 | q_score 2208 | q_pcnt=100* q_score/sum (q_score) 2210 | tenant_q_pcnt = 100* sum(q_score) by tenant/sum (q_score) 2212 |
|---|---|---|---|---|---|
| tenant_A | small | Fetch foo...FROM... | 10 | 3.8% | |
| | | Fetch bar...FROM... | 20 | 7.2% | 11% |
| tenant_B | small | Fetch zap...FROM... | 10 | 3.8% | |
| | | Fetch baz...FROM... | 10 | 3.8% | 7.6% |
| tenant_C | large | Fetch qux...FROM... | 40 | 14.4% | |
| | | Fetch blort...FROM... | 160 | 61.5% | |
| | | Fetch zing...FROM... | 10 | 3.8% | 79.7% |

FIG. 22A

| Tenant 2202 | plan_size 2204 | Query 2206 | q_score 2208 | q_pcnt=100* q_score/sum (q_score) 2210 | tenant_q_pcnt = 100* sum(q_score) by tenant/sum (q_score) 2212 |
|---|---|---|---|---|---|
| tenant_A | small | Fetch foo...FROM... | 10 | 10% | |
| | | Fetch bar...FROM... | 10 | 10% | 20% |
| tenant_B | small | Fetch zap...FROM... | 10 | 10% | |
| | | Fetch baz...FROM... | 20 | 20% | 30% |
| tenant_C | large | Fetch qux...FROM... | 20 | 20% | |
| | | Fetch blort...FROM... | 10 | 10% | |
| | | Fetch zing...FROM... | 20 | 20% | 50% |

FIG. 22B

| Tenant 2202 | plan_size 2204 | Query 2206 | q_score 2208 | q_score_scaled 2216 | q_pcnt=100* q_score/sum (q_score) 2210 | tenant_q_pcnt = 100* sum(q_score) by tenant/ sum (q_score) 2212 |
|---|---|---|---|---|---|---|
| tenant_A | small | Fetch foo...FROM... | 10 | 10 | 9.75% | |
| | | Fetch bar...FROM... | 20 | 20 | 19.75% | 29.25% |
| tenant_B | small | Fetch zap...FROM... | 10 | 10 | 9.75% | |
| | | Fetch baz...FROM... | 10 | 10 | 9.75% | 19.5% |
| tenant_C | large | Fetch qux...FROM... | 40 | 10 | 9.75% | |
| | | Fetch blort...FROM... | 160 | 40 | 39% | |
| | | Fetch zing...FROM... | 10 | 2.5 | 9.75% | 58.5% |

FIG. 22C

| Tenant 2202 | plan_size 2204 | Query 2206 | q_score 2208 | q_score_scaled 2216 | q_pcnt=100* q_score/sum (q_score) 2210 | tenant_q_pcnt = 100* sum(q_score) by tenant/ sum (q_score) 2212 |
|---|---|---|---|---|---|---|
| tenant_A | small | Fetch foo...FROM... | 10 | 10 | 13% | |
| | | Fetch bar...FROM... | 20 | 20 | 26% | 39% |
| tenant_B | small | Fetch zap...FROM... | 10 | 10 | 13% | |
| | | Fetch baz...FROM... | 10 | 10 | 13% | 26% |
| tenant_C | XL | Fetch qux...FROM... | 40 | 5 | 6.5% | |
| | | Fetch blort...FROM... | 160 | 20 | 26% | |
| | | Fetch zing...FROM... | 10 | 1.75 | 2.2% | 35% |

FIG. 22D

CELL-BASED ARCHITECTURE FOR AN EXTENSIBILITY PLATFORM

RELATED APPLICATION

This application is a continuation of U.S. patent application Ser. No. 18/129,448, filed Mar. 31, 2023, which claims priority to U.S. Prov. Appl. No. 63/326,237, filed Mar. 31, 2022, both entitled CELL-BASED ARCHITECTURE FOR AN EXTENSIBILITY PLATFORM, by Hendrey, et al., the contents of which are incorporated herein by reference.

TECHNICAL FIELD

The present disclosure relates generally to computer systems, and, more particularly, to a cell-based architecture for an extensibility platform.

BACKGROUND

The Internet and the World Wide Web have enabled the proliferation of web services available for virtually all types of businesses and many online applications now rely on a distributed set of web services to function. These web services introduce complex data dependencies, complex data handling configurations, and various other operational nuances, which make monitoring them particularly challenging. Indeed, the monitoring and logging of data across web services is currently handled today in a discrete and/or non-centralized fashion with respect to each web service. Doing so in this manner also makes it difficult to associate the logged data across the different web services. In addition, monitoring the web services in a discrete manner also runs the risk of breaking the software application already running in the cloud, such as when monitoring code is added for one web service without accounting for where that web service fits within the overall execution of the application and with respect to its dependencies, data handling, etc. In addition, using a centralized pool of resources for the monitoring platform could also negatively impact those customers concurrently using those resources.

BRIEF DESCRIPTION OF THE DRA WINGS

The embodiments herein may be better understood by referring to the following description in conjunction with the accompanying drawings in which like reference numerals indicate identically or functionally similar elements, of which:

FIG. 4 illustrates an example of layers of full-stack observability;

FIG. 12 illustrates an example of resource mapping configurations;

FIGS. 22A-22D illustrate an example of maintaining active query entries a "q_score" table.

DESCRIPTION OF EXAMPLE EMBODIMENTS

Overview

Figure 1:
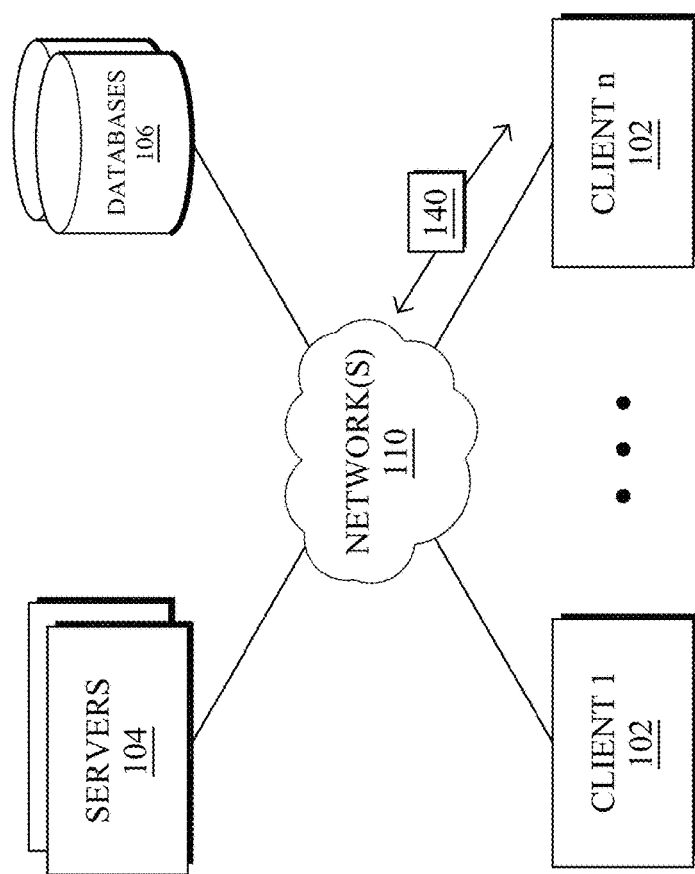
FIG. 1 illustrates an example computer network.

According to one or more embodiments of the disclosure, a cell-based architecture for an extensibility platform is described herein, whereby the extensibility platform is able to monitor distributed web services of an application centrally. In particular, the techniques herein are directed toward leveraging a cell-based architecture in conjunction with the extensibility platform. In a cell architecture, each cell represents a set of connected web services and the "entire system" (modulo global elements) is stamped out many times in a given region, where cells are totally isolated from each other (no network connectivity between cells). Cells limit the blast radius (number of tenants (e.g., one or more user or organization that utilizes a single instance of an application, a cell, etc.) per cell affected by a problem), provide predictable capacity and scalability requirements, and create dedicated environments for bigger customers. A cell architecture effectively enjoys repeatable deployment and software development frameworks by virtue of the fact that even within a region hundreds of cells are stamped out. The techniques herein also address service rate limiting in cells for the extensibility platform.

Specifically, according to one or more embodiments of the disclosure, an illustrative method herein may comprise: managing a particular cell of a multi-celled architecture for an extensibility platform having one or more tenants served by datastores of the particular cell; connecting to a global cell manager for global cell management of all cells of the multi-celled architecture; identifying a consumption limit indicating a maximum amount of system resources that a particular tenant of the one or more tenants is allowed to consume of the particular cell; enforcing the consumption limit on the particular tenant; and ensuring that the particular tenant is provided system resources of the particular cell up to the consumption limit without limitation.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
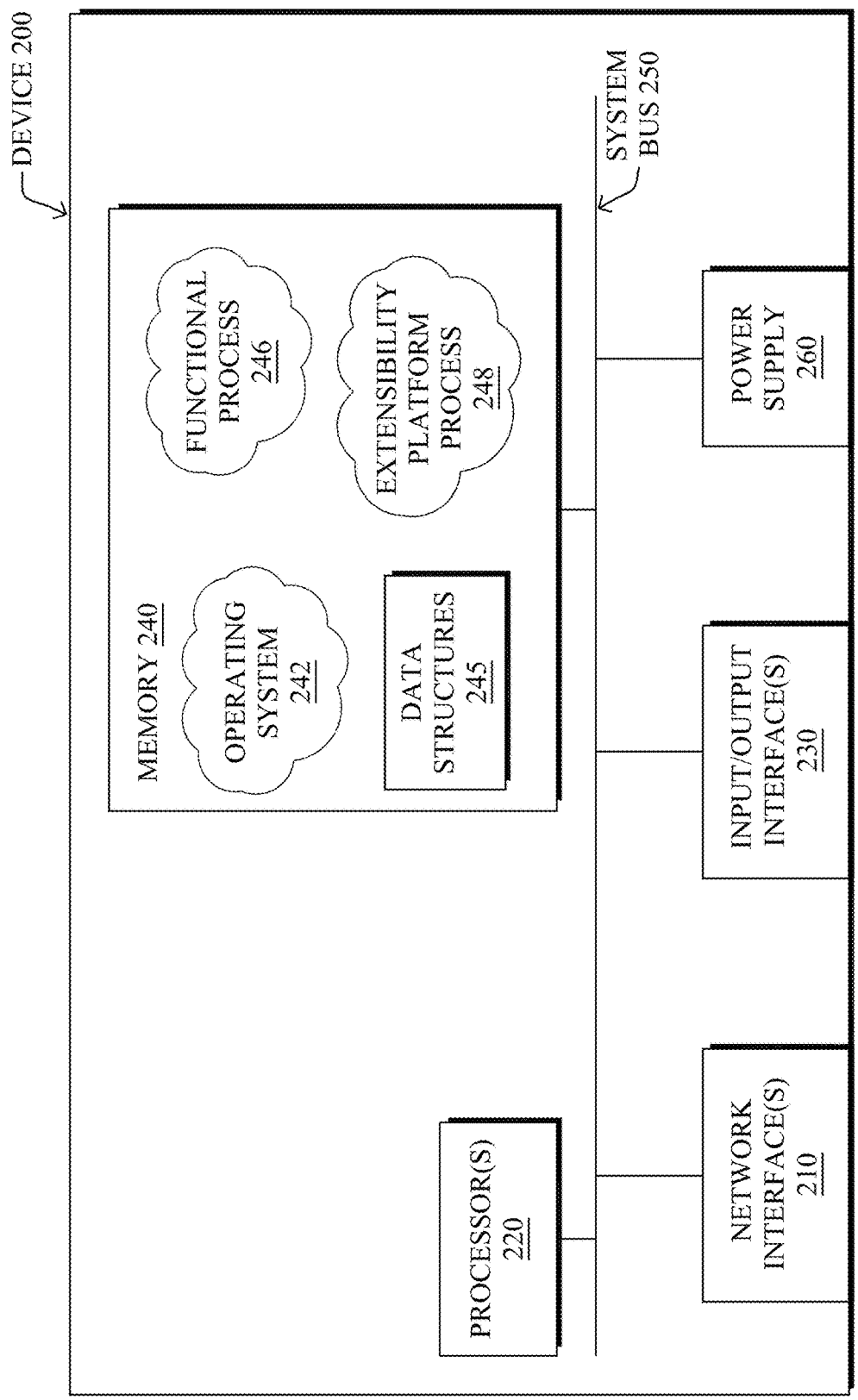
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "extensibility platform" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Observability Intelligence Platform

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
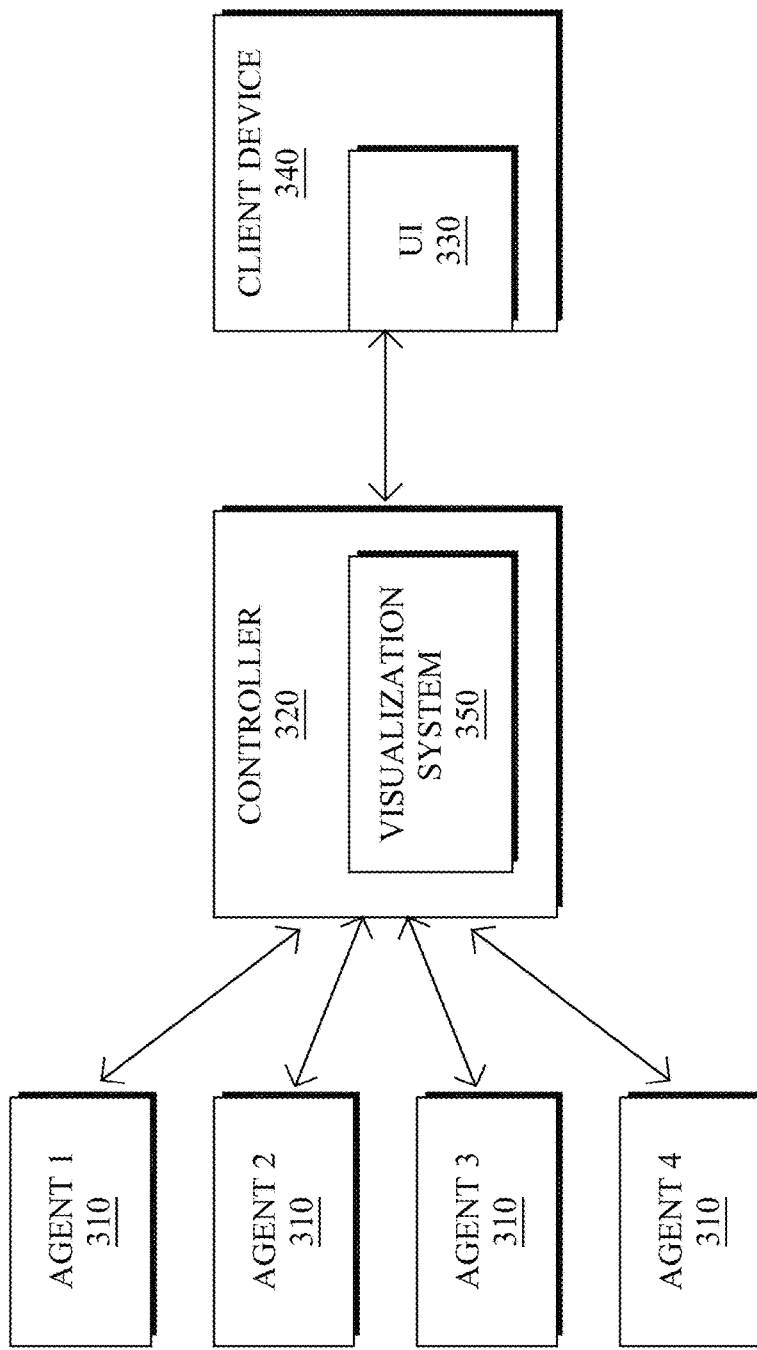
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the observability intelligence platform 300. In an illustrative on-premises (On-Prem) implementation, a controller instance 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

An Extensibility Platform

One specific example of an observability intelligence platform above is the AppDynamics Observability Cloud (OC), available from Cisco Systems, Inc. of San Jose, California. The AppDynamics OC is a cloud-native platform for collecting, ingesting, processing and analyzing large-scale data from instrumented complex systems, such as Cloud system landscapes. The purpose of the platform is to host solutions that help customers to keep track of the operational health and performance of the systems they observe and perform detailed analyses of problems or performance issues.

AppDynamics OC is designed to offer full-stack Observability, that is, to cover multiple layers of processes ranging from low-level technical processes such as networking and computing infrastructure over inter-service communication up to interactions of users with the system and business processes, and most importantly, the interdependencies between them. FIG. 4, for example, illustrates an example 400 of layers of full-stack observability, demonstrating measurable software technologies, sorted and grouped by proximity to the end customer. For instance, the layers 410 and associated technologies 420 may be such things as:

Outcomes:
  payment/revenue; goods/services received; inventory updated; dissatisfaction/satisfaction; success/failure; support; brand capital; etc.

Interactions:
  page views; impressions; gestures; clicks; voice commands; keystrokes; downloads; attention; etc.
Experiences:
  sessions; app usage; IoT usage; messaging/notifications; waiting/latency; errors/bugs etc.
Journeys:
  business journeys; workflows; etc.
App Flows:
  business transactions; service endpoints; calls; third party "backends"; etc.
Applications:
  application services; APIs; microservices; scripts; daemons; deployments; etc.
Infrastructure Services:
  databases; virtual machines; containers; orchestration; meshes; security services; logging; etc.
Infrastructure:
  servers; networks; storage; compute; datacenters; load balancers; etc.

Each of these layers has different types of entities and metrics that need to be tracked. Additionally, different industries or customers may have different flavors of each layer or different layers altogether. The entirety of artifacts represented in each layer and their relationships can be described—independent of any digital representation—in a domain model.

In the development of a conventional application, the domain model is encoded in a data model which is pervasively reflected in the coding of all parts of a solution and thus predetermines all its capabilities. Any substantial extension of these capabilities requiring changes in the data model results in a full iteration of the software lifecycle, usually involving: Updating database schemas, data access objects, in-memory representation of data, data-processing algorithms, application interface (API), and user interface. The coordination of all these changes to ensure the integrity of the solution(s) is particularly difficult in cloud-native systems due to their distributed nature, and substantial teams in every software company are dedicated to this task.

The task becomes harder the more moving parts and the more actors are involved. But the sheer bandwidth of domain models and functionality hinted at in FIG. 4 above makes it all but impossible for a single company to deliver all the required solutions in a centralized development process. A platform thus should allow customers and partners to adapt and extend the solutions, or even provide entirely new solutions, with minimal risk of breaking or compromising the production system running in the cloud. The biggest challenge lies in the fact that all these solutions are not isolated from each other but must run for each tenant as an individually composed, integrated application sharing most of the data and infrastructure.

In order to make this possible, the techniques herein are directed at taking a novel approach to solution composition, informed by elements of model-driven architecture, graph data models, and modern pull-based software lifecycle management. That is, the techniques herein, therefore, are directed toward an extensibility platform that provides a solution packaging system that allows for data-type dependencies.

Figure 5:
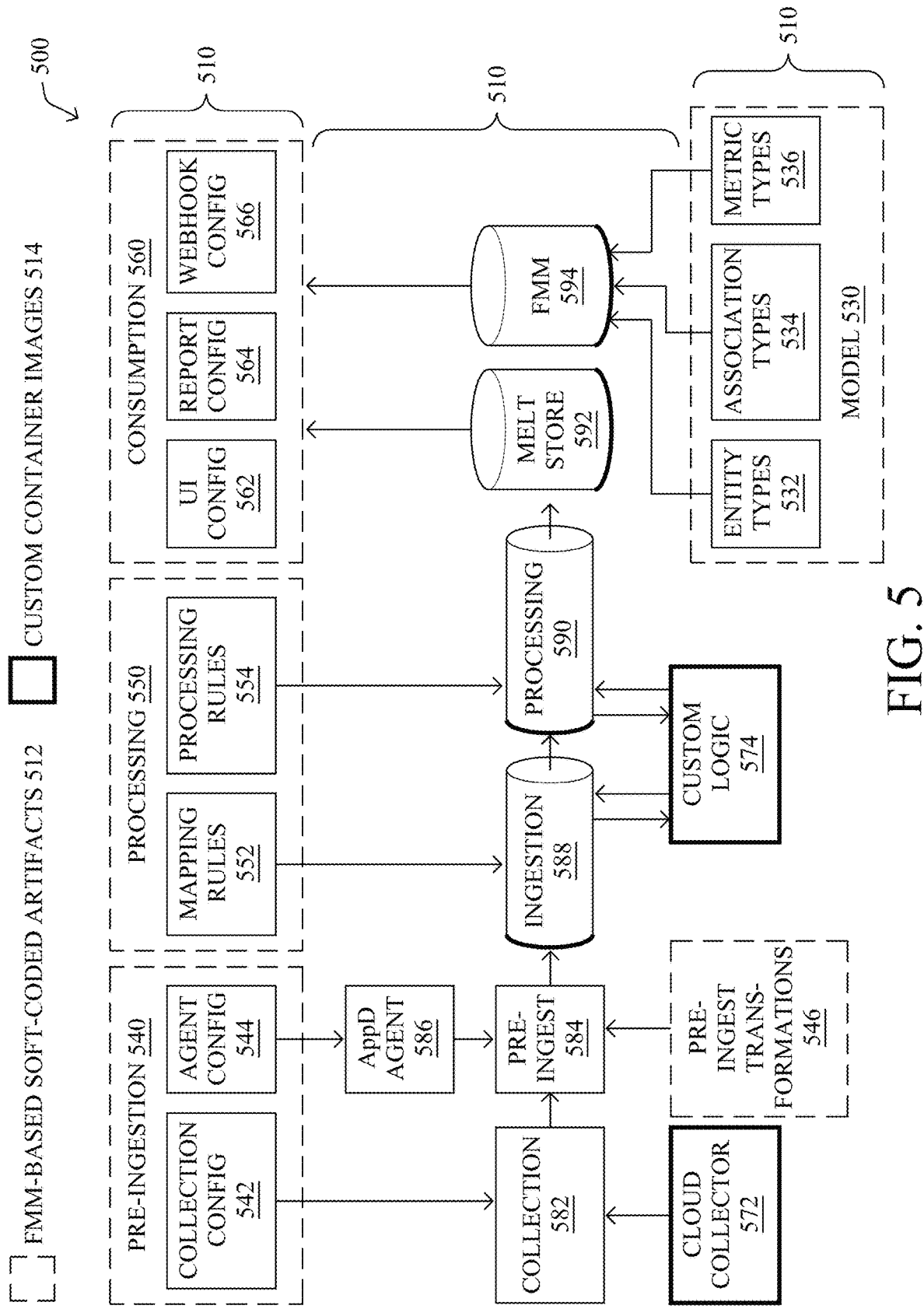
FIG. 5 illustrates an example platform data flow.

Operationally, the extensibility platform is built on the principle of strictly separating the solutions from the executing platform's technology stack in order to decouple their respective life cycles. The solutions are very much (e.g., almost entirely) model-driven, so that the platform can evolve and undergo optimizations and technological evolution without affecting the existing solutions. In the rare cases in which the models are not powerful enough, custom logic can be provided as a Function as a Service (FaaS) or container image exposing a well-defined service interface and running in a strictly controlled sandbox. FIG. 5, for instance, showing a platform data flow 500 (described further below), illustrates how different solution-specific artifacts 510 interact with the platform's core functionality 520 (e.g., the data flow in the middle).

Solutions herein thus provide artifacts that enrich, customize, or alter the behavior data ingestions, processing, and visualizations. This allows a company and/or application such as IT management companies/apps to provide a customized monitoring solution for data management platforms (e.g., NoSQL databases), for example, on the observability intelligence platform above. Such a custom solution may therefore include the definition of data management platform entities that are monitored, and the relationship between those entities, and their metrics. The example IT management app for data management platforms can also provide enrichments to the user interface, such as providing distinct iconography for their entities, and bundling dashboards and alerts that take particular advantage of data management platform-specific metrics, such as a data management platform heartbeat metric. This same system of packaging may be used to provision the system with having "core" domains specific to the illustrative observability intelligence platform, the only difference being that subscription to system apps is automatic. In addition, first party apps like EUM may also leverage the same system.

In particular, the extensibility platform techniques herein are directed to a solution packaging system that allows for data-type dependencies. It is essentially the JSON store and solution packaging that are collectively referred to herein as "Orion". The system is designed to allow modules to have dependencies like a traditional code/packaging system like java+maven, while simultaneously allowing these models to define their data model, access to that data model, packaging of objects conforming to other data solution data models, etc. This relies heavily on the concept of "layering". While other systems may allow layering of local files, the ability to have layers that include global dynamic layers, as well as static global layers provided as part of a solution is never before seen, and solves a big problem.

As described herein, the techniques herein provide a system designed to provide "full stack observability" for distributed computer systems. That is, the system provides the ability to receive Metrics, Events, Logs, and Traces (MELT) data/signals in accordance with Open Telemetry standards. It also provides the ability to maintain an internal model of the actual entities being observed, as well as an ability to map incoming data/signals to entities under observation. Further, the extensibility platform herein provides the ability to query the entities of the system with regard to their associated MELT data/signals, and to infer health and other computed signals about entities. Entities may also be grouped together into composite entities to thus receive, generate, and maintain data/signals about composite entities, accordingly. Moreover, as detailed herein, the platform also has an openness to first, second, and third parties to "extend" all of the above so that the platform can continuously incorporate new use cases without each use case having to be "hand written" by the core engineering team.

The techniques herein also provide extensibility in a multi-tenant, app-aware, platform for MELT data processing, allowing for third parties to create solutions to which tenants can subscribe, and allowing for system capabilities to be defined and packaged in a way that is functionally identical to third party solutions. In addition, this allows third parties to extend the platform with capabilities not previously envisioned, such as, e.g., to augment the platform with new data types and storage for instances of those types, to augment the platform with new functions (lambda style), to augment the platform interfaces (REST, gRPC) with new APIs whose implementation is backed by lambda style functions and data storage, to augment the platform's built-in data processing in ways that benefit the solution without impacting tenants who have not subscribed to the solution, and so on.

Through providing extensibility in a multi-tenant, app-aware, platform for MELT data processing, the techniques herein also provide an extensible object modeling system for a multi-tenant microservices architecture. This allows dynamic composition of objects from mutable layers, which allows for applications/solutions to define object types, and for applications/solutions to bundle object instances (instances may be of a type defined by another solution that is a dependency or defined locally in the same solution). It also allows for tenants to override application/solution values, which enables tenants to customize the behavior of a solution.

The dynamic composition of objects from mutable layers also allows an implementation comprised of a tree-shaped object layering system with layers/awareness for, illustratively:
  depth 0 (tree root): global system settings/fields;
  depth 1: global application/solution constructs;
  depth 2: account (a collection of tenants spanning multiple cells);
  depth 3: tenant; and
  depth 4: user.

Moreover, the dynamic composition of objects from mutable layers further allows a communication system between globally distributed cells to enable each cell to have a synchronized local copy of the global layers, as well as a read-time composition system to compose object from layers.

The extensible object modeling system for a multi-tenant microservices architecture further provides a system for global solution management, which comprises a method of packaging apps/solutions, a method of declaring dependencies between solutions, a customer facing solution registry allowing developers to list their solutions, and so on.

The multi-tenant microservices architecture further provides a type system of meta-data for defining objects and their layers. That is, the techniques herein allow for specifying the shape of objects, declaring global/solution level object instances inside of solution packages, specifying which fields of the object support layering, specifying which fields are secrets, allowing inter-object references (e.g., allowing runtime spreading of fields to support inheritance and other use cases, allowing recursive prefetching of fields, allowing references to global object-layer-resident instances, etc.), and so on.

Additionally, the multi-tenant microservices architecture herein provides a system for managing object storage and retrieval by type. For instance, such a system may define a method of routing traffic to object stores based on the object type (e.g., a federation of object stores providing a single API/facade to access all types), as well as allowing atomic, eventually consistent maintenance of references between objects.

The extensible object modeling system for a multi-tenant microservices architecture additionally provides a system for insuring atomicity of installation and updates to multi-object application/solutions across microservices in a cell. It also provides a library/client that allows pieces of our internal system to query and observe objects for changes (e.g., allowing MELT data ingestion pipeline to store configuration objects in memory, and avoiding having to query for "freshness" each time the object is needed).

As detailed herein, there are numerous concepts generally addressed by the extensibility platform of the present disclosure. Such concepts may comprise such things as:
  a programmable data ingestion framework;
  atomic maintenance of references between objects in a distributed type system;
  atomicity of keys in document shredding for domain events;
  automation of sagas in a distributed object store;
  type systems in functions as a service (FaaS);
  large scale data collection programmable by an end user;
  managing multi-tenancy in data ingestion pipeline;
  federation of a distributed object store;
  improvements to operations in a distributed object store;
  expression of user interface customization in terms of flexibly defined entity models;
  a system of type layering in a multitenant, global distributed system;
  customizing the inputs of a multi-tenant distributed system;
  management of secure keys in a distributed multi-tenant system;
  managing secure connections to external systems in a "bring your infrastructure" scenario;
  automating workflows for the collection of secrets in a layered configuration system;
  protecting developer secrets in FaaS environment;
  Optimization of FaaS using intelligent caching in a programmable distributed data environment;
  automating failover and restoration in a cell based architecture;
  a modular entity modeling system;
  a potential replacement for traditional telemetry for dashboards;
  eventually consistent deployment of artifacts in distributed data processing pipeline;
  Configuration-driven extensible MELT data processing pipeline;
  Extracting additional value from the MELT data via customizable workflows;
  Creating a graph-centric model from MELT data for observability;
  Tag-aware attribute based access control for distributed systems;
  Metadata-based graph schema definition;
  Ensuring fairness in a multi-tenant system via rate limiting;
  Configuration-driven Query Composition for Graph Data Structures;
  And so on.

Notably, and to aide in the discussion below, the smallest deployable unit of extension is a "solution", which is a package of models, configurations, and potentially container images for customizing extension points. Solutions can depend on other solutions. For example, a system health solution depends on a "Flexible Meta Model" (FMM) solution (described below), since health apps provide entities and metrics that depend on an FMM-type system. Core solutions may be automatically installed in each cell (e.g., similar to how certain platforms come with certain libs pre-installed with the system). Note further that a "solution artifact" is a JSON configuration file that a solution uses to configure an extension point.

An extension point, that is, is a part of the extensibility platform that is prepared to accept a configuration or other artifact to steer its behavior. Since the architecture of the extensibility platform herein is largely model-driven, most of the extensions can be realized by means of soft-coded artifacts: Model extensions and configurations expressed as JSON or other declarative formats. For instance, as shown in the extensibility platform data flow 500 in FIG. 5, soft-coded extension artifacts 512 are shown, while for more complex—or stateful—logic, services can be plugged in, i.e., custom container images 514. The extension points can be divided into four groups, Model, Pre-Ingestion, Processing, and Consumption, as shown:

Model 530 (e.g., entity types 532, association types 534, and metric types 536);

Pre-Ingestion 540 (e.g., collection configuration 542, agent configuration 544, and pre-ingestion transformations 546);

Processing 550 (e.g., mapping rules 552, and processing rules 554); and Consumption. 560 (e.g., UI configuration 562, report configuration 564, and webhook configuration 566)

Moreover, custom container images 514 may comprise such things as a Cloud Collector 572 and Custom Logic 574.

As also shown in FIG. 5, the platform's core functionality 520 may comprise collection 582, pre-ingestion 584 (e.g., with agent configuration 544 coming via an observability or "AppD" agent 586), ingestion 588, processing 590, MELT store 592, and an FMM 594, with the functionalities being interconnected to each other and/or to the different solution-specific artifacts 510 as shown, and as generally described in detail herein.

Regarding details of the extensibility platform of the present disclosure, at the core of the extensibility platform herein is the Flexible Meta Model (FMM), which allows creation of models of each solution's specific artifacts, that is, entities (such as services or user journeys) and their associated observed data: Metrics, Events, Logs and Traces (together abbreviated as MELT).

Figure 6:
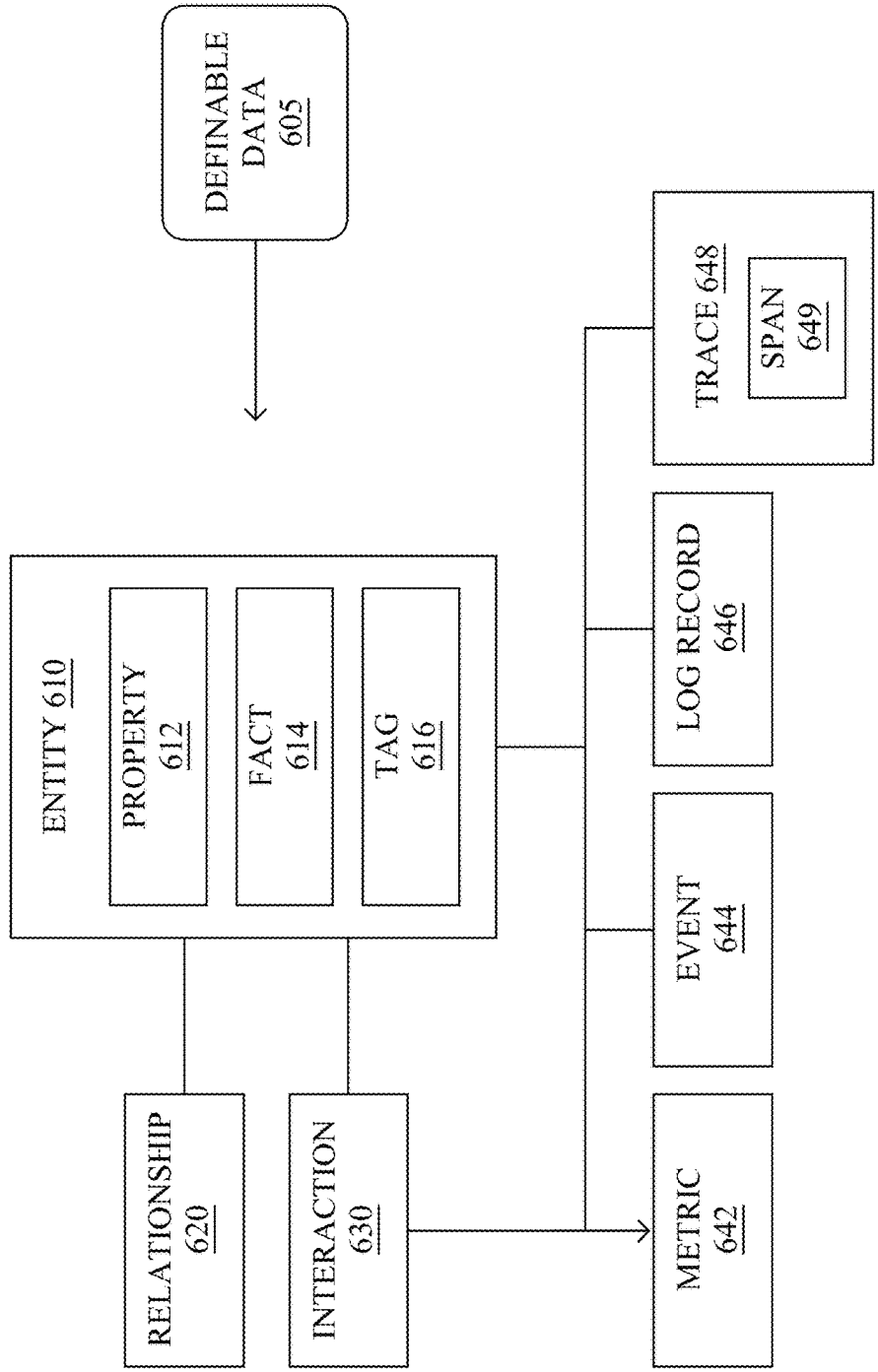
FIG. 6 illustrates an example of a Flexible Meta Model (FMM)

FIG. 6 shows a simplified schematic of the FMM 600. Each of the shaded boxes represents a "kind" of data 605 for which specific types (and instances) can be defined. Entity types 610 may have a property 612, fact 614, and tag 616. Examples for entity types 610 are: Service, Service Instance, Business Transaction, Host, etc.

Relationship types 620 define how entities are associated to each other (for example "contains" or "is part of"). Interaction types 630 describe how entities interact with each other. They combine the semantics of association types (e.g., a service "calls" a backend) with the capability of entity types to declare MELT data (Metric 642, Event 644, Log Record 646, and Trace 648 (with Span 649). In one embodiment, interaction types are treated just like entity types, though not so in other embodiments.

Figure 7A:
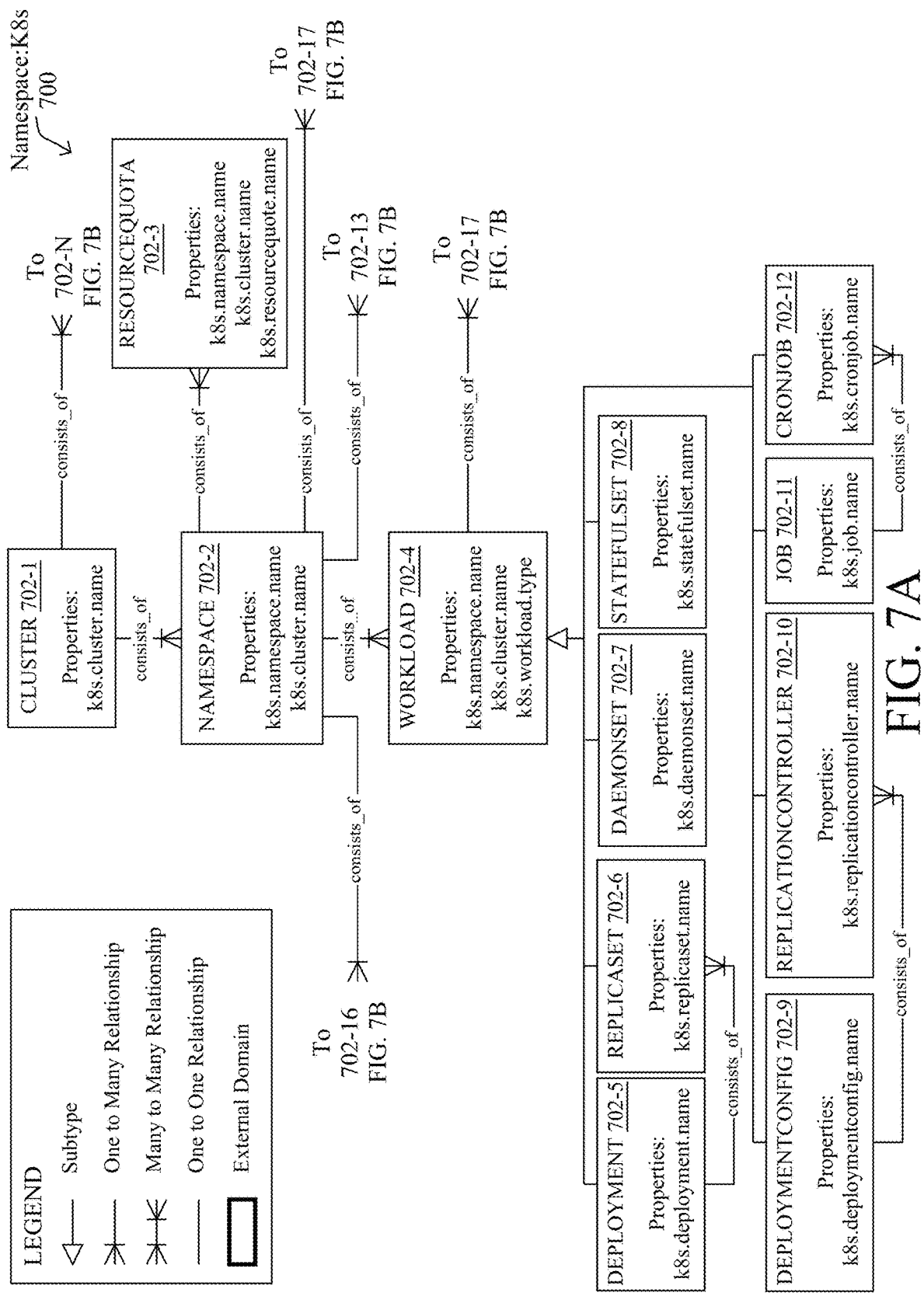
FIGS. 7A-7B illustrate a high-level example of a container orchestration domain model.
Figure 7B:
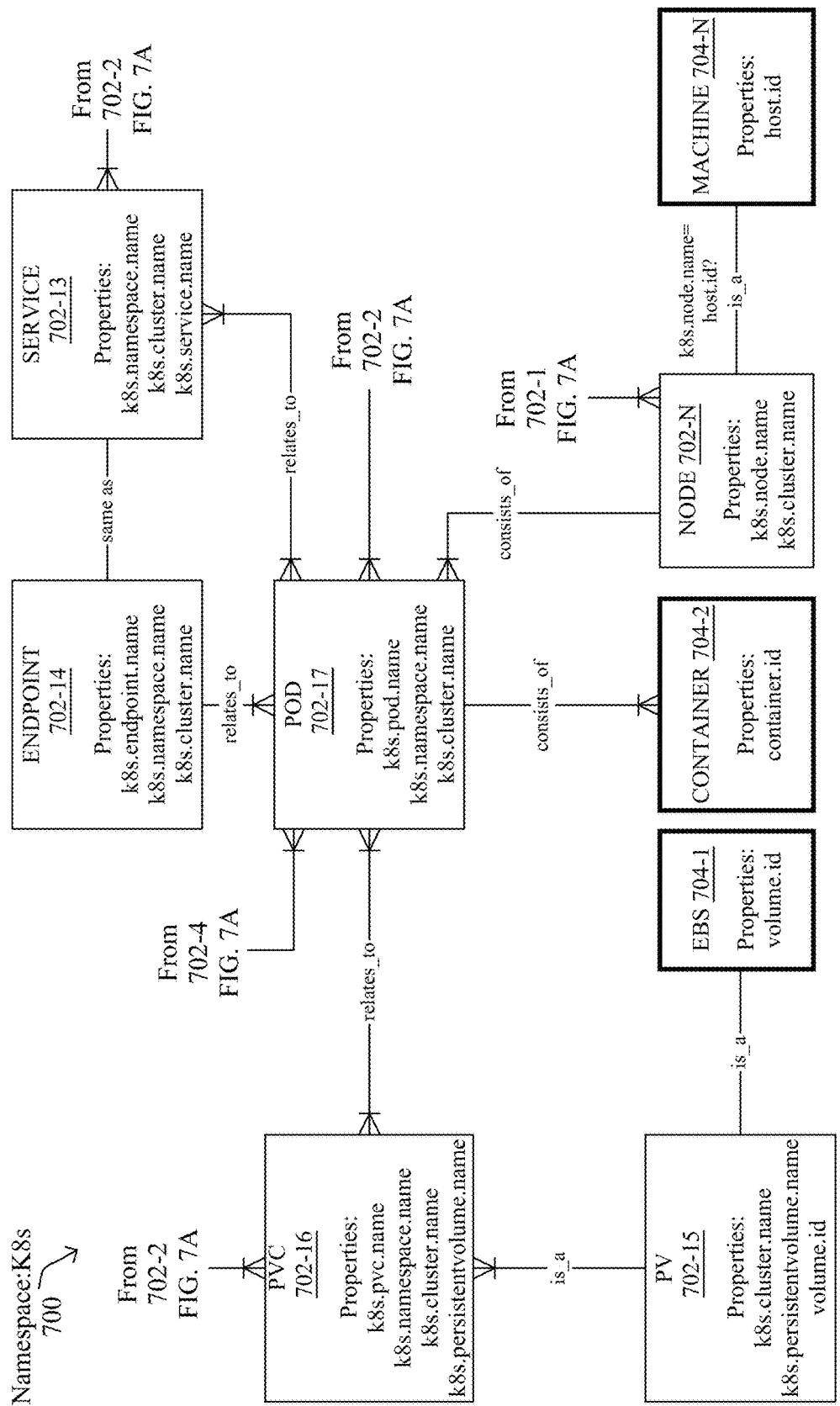

Based on this meta model, models of specific domains (such as a container orchestration) can be created. For instance, FIGS. 7A-7B illustrate a high-level example of a container orchestration domain model 700 (e.g., a Kubernetes or "K8s" domain model). The container orchestration domain model 700 may be made up of model components 702 (e.g., 702-1 . . . 702-N) organized with the illustrated relationships (e.g., subtype, one to many relationship, many to many relationship, one to one relationship). Additionally, the container orchestration domain model 700 may include model components that are external domain model components 704 (e.g., 704-1 . . . 704-N) that represent external domains sharing the illustrated relationships to the other model components 702. These models determine the content that a user eventually sees on their screen.

To complement this flexible metamodel, the platform has schema-flexible stores to hold the actual data: The graph-based entity store and schema-flexible stores for metrics, events, logs and traces respectively. Thus, a customer who wants to extend the data model just modifies the corresponding model in the FMM and can immediately start populating the data stores with the respective data, without having to make changes to the data stores themselves.

Corresponding changes in the models/configurations driving the data processing pipeline will immediately start generating the data to populate the stores according to the model changes. An important feature of the extensibility platform is that it doesn't treat the respective models of a solution (FMM data model, data processing and consumption models) in isolation. These models refer to each other (e.g., a UI field will have a reference to the field in the data model it represents) and the integrity and consistency of these mutual references is tracked and enforced.

The extensibility platform herein is cloud-native, but at the same time, it allows every tenant to experience it as an individually configured application that reflects their specific business and angle of view. The tenants achieve this by selectively subscribing to solutions for each aspect of their business, and in some cases by even adding their own custom solutions.

Figure 8:
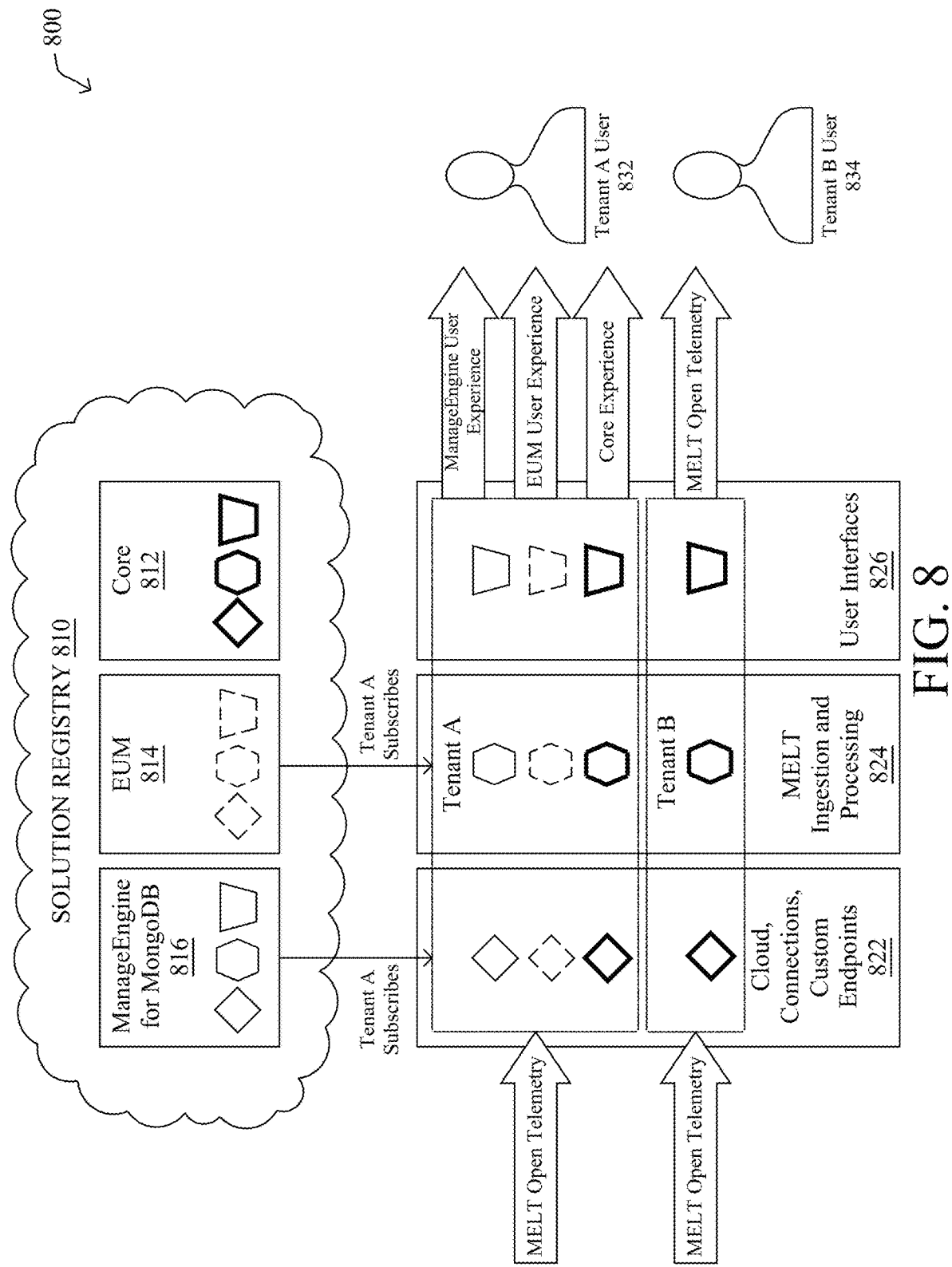
FIG. 8 illustrates an example of a sophisticated subscription and layering mechanism.

This is made possible by a sophisticated subscription and layering mechanism, illustrated in FIG. 8, illustrating tenant-specific behavior of the extensibility platform as a result of selective activation and layering of models. In this example mechanism 800, the solution registry 810 has three registered solutions, the platform core 812, End User Monitoring (EUM) 814 and a hypothetical third party solution, such as ManageEngine for MongoDB 816. Each of these solutions contains models for cloud connections and custom endpoints 822, MELT data ingestion and processing 824, and User Interfaces 826, respectively.

For each tenant (e.g., "A" or "B"), only the models that they are subscribed to are being used in the course of data collection, ingestion, processing and consumption, hence the experience of the tenant A user 832 in FIG. 8 is different from that of the tenant B user 834.

A particularly noteworthy characteristic of the platform herein is that these solutions don't necessarily live side-by-side. Rather, a solution can build on top of another solution, amend, and customize it. The final experience of tenant A user is therefore the result of the layering of the three subscribed solutions, where each can make modifications of the models of the layers below.

Notably, the scaling model of the extensibility platform herein is based on cells, where each cell serves a fixed set of tenants. Thus the solution registry and model stores of each cell keep the superset of all the solutions (and the corresponding artifacts) to which the tenants of the cell have subscribed. When a tenant subscribes to a solution, the solution registry checks whether that solution is already present in the cell. If not, it initiates a pull from the solution repository.

Figure 9:
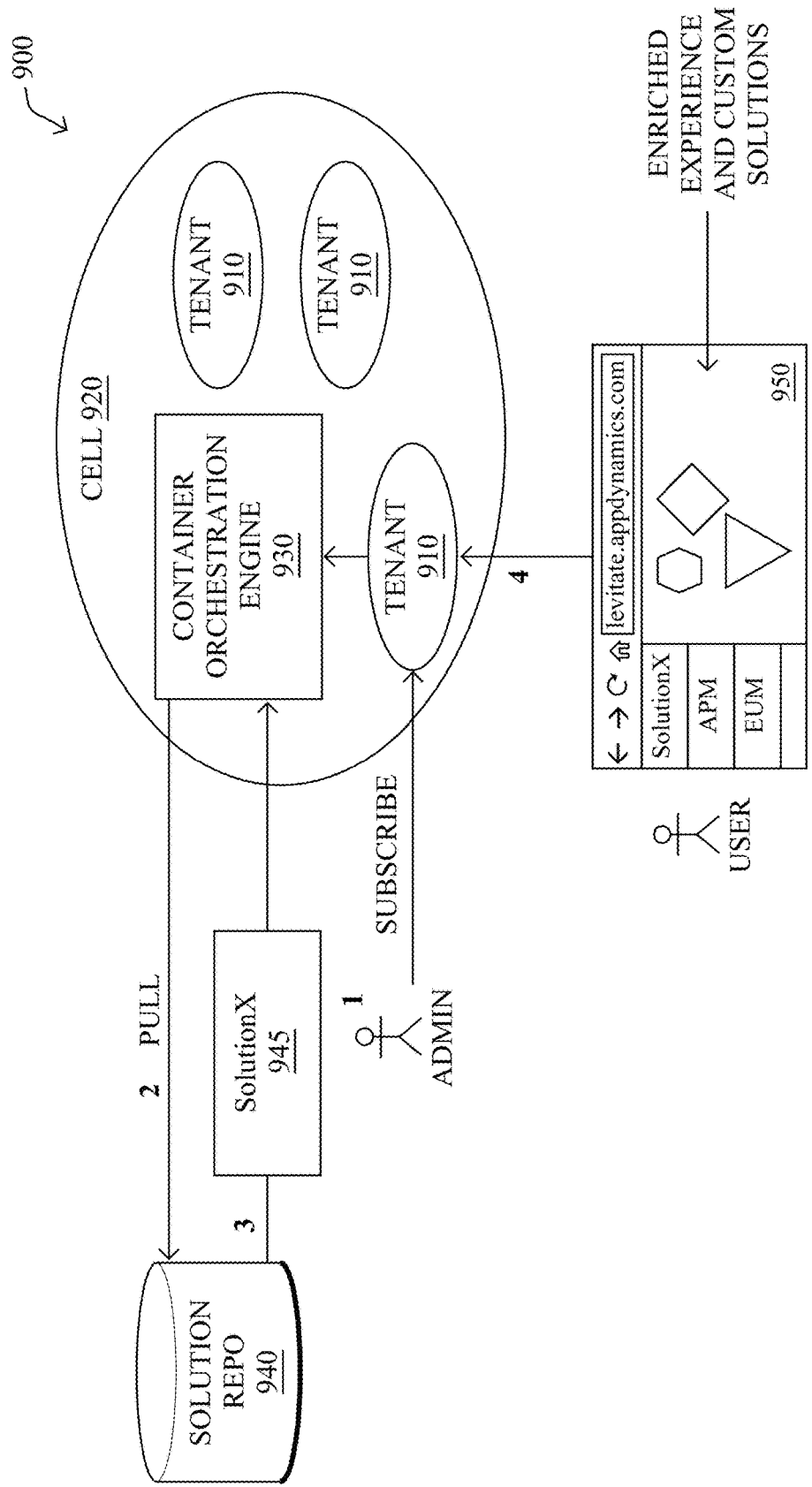
FIG. 9 illustrates an example interplay of tenant-specific solution subscription with cell management.

This concept is shown generally in FIG. 9, illustrating an example interplay 900 of tenant-specific solution subscription with cell management. In particular, tenants 910 exist within a cell 920, with an associated container orchestration engine 930 which pulls solutions 945 from a solution repository 940 ("solution repo"). A user interface 950 for the extensibility platform, such as an observability intelligence platform, can then illustrate an enhanced experience with custom solutions, accordingly.

Notably, in FIG. 9, when a solution is present in the cell (i.e., all its artifacts are present in the corresponding model stores), the solution is activated for the tenant. At that moment, the corresponding models/configurations will start taking effect.

Since the extensibility platform herein is a large distributed system, the models and configurations are not centrally stored but rather in multiple stores, each associated with one or more consumers of the respective model. Each of these stores is an instance of the same generic JSON store, and through routing rules, they are exposed as a single API with consistent behavior.

Figure 10:
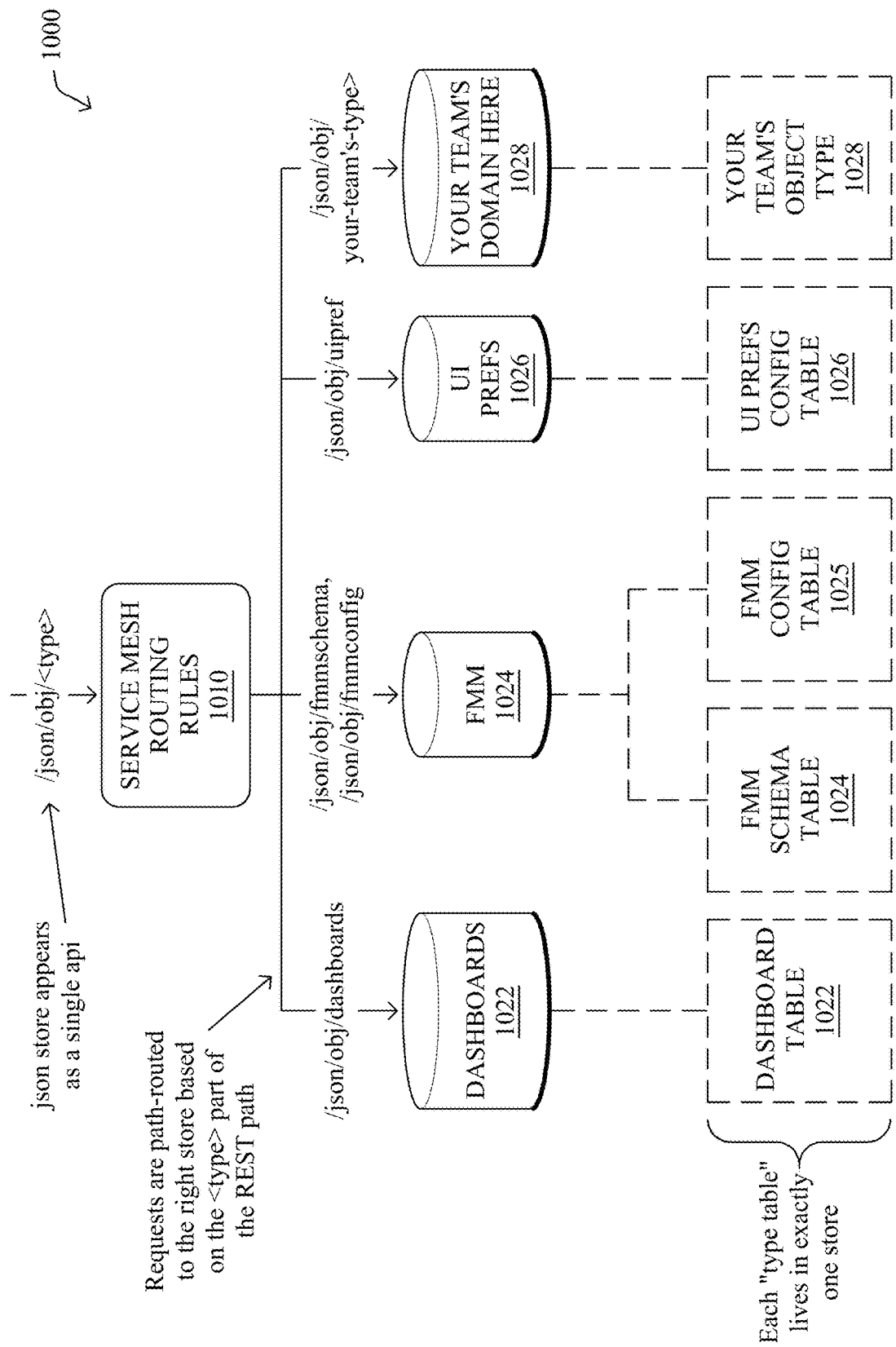
FIG. 10 illustrates an example of exposure of different configuration stores as a single API.

FIG. 10 illustrates an example 1000 of exposure of the different configuration stores as a single API. In particular, as shown, the JSON store appears as a single API and illustratively begins at service mesh routing rules 1010, where requests may be path-routed to the right store based on the <type> part of the REST path. The example stores may comprise dashboards 1022, FMM 1024, UI preferences 1026, custom stores 1028 (e.g., "Your Team's Domain Here"), and so on. From there, each "type table" lives in exactly one store. For instance, dashboard table 1032 (from dashboards 1022), FMM schema table 1034 or FMM config table 1035 (e.g., depending upon the access into FMM 1024), UI preferences config table 1036 from UI prefs 1026, and custom tables 1038 (e.g., from custom stores 1028, such as "Your Team's object type" from "Your Team's Domain Here").

Regarding a configuration-driven data processing pipeline herein, a core feature of the extensibility platform herein is its ability to ingest, transform, enrich, and store large amounts of observed data from agents and OpenTelemetry (OT) sources. The raw data at the beginning of the ingestion process adheres to the OpenTelemetry format, but doesn't have explicit semantics. In a very simplified way, the raw data can be characterized as trees of key-value pairs and unstructured text (in the case of logs).

The purpose of the processing pipeline is to extract the meaning of that raw data, to derive secondary information, detect problems and indicators of system health, and make all that information "queryable" at scale. An important part of being queryable is the connection between the data and its meaning, i.e., the semantics, which have been modeled in the respective domain models. Hence the transformation from raw data to meaningful content can't be hard-coded, it should (e.g., must) be encoded in rules and configurations, which should (e.g., must) be consistent with the model of each domain.

Figure 11A:
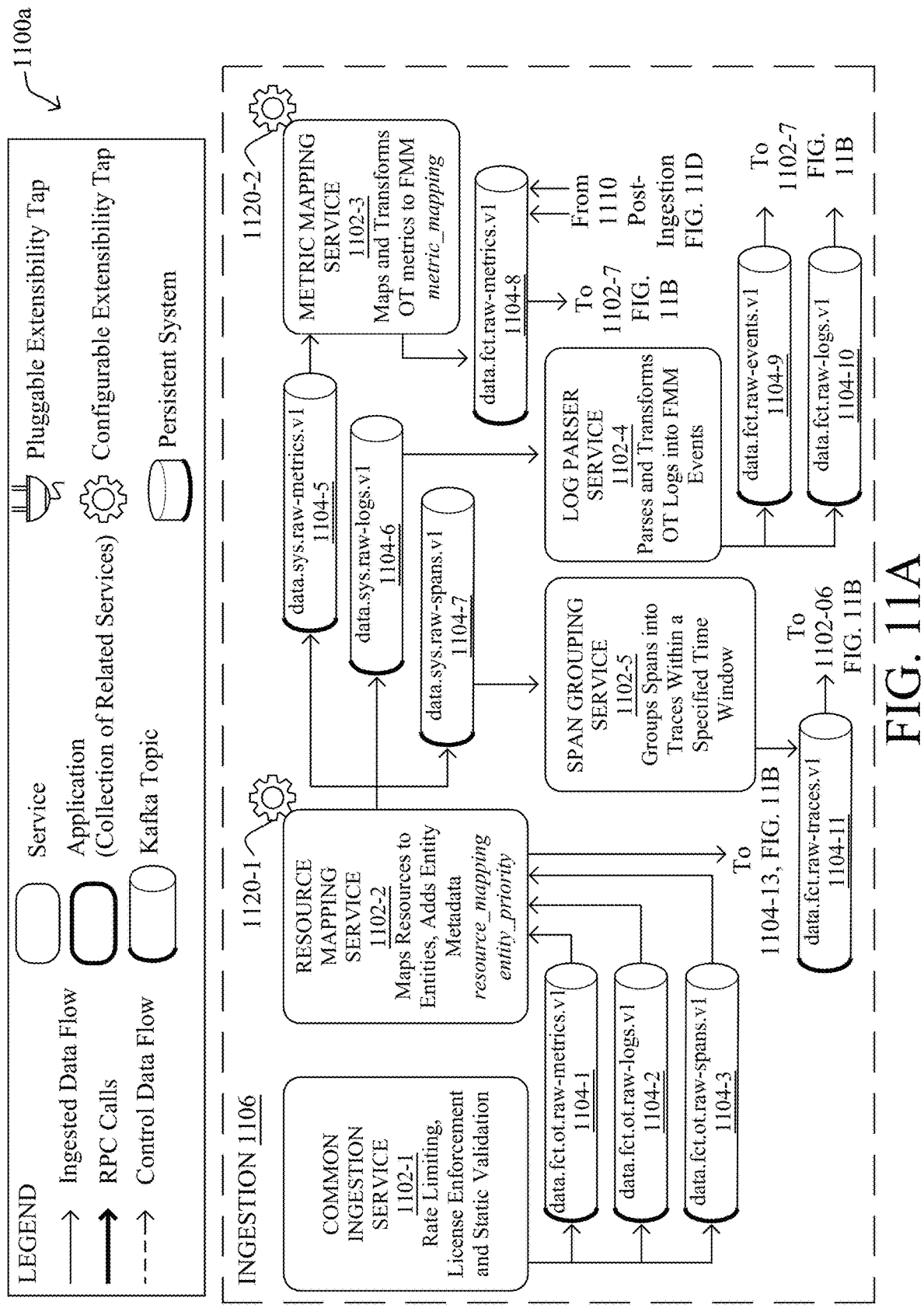
FIGS. 11A-11E illustrate an example of a common ingestion pipeline, in particular where each of FIGS. 11A-11E illustrate respective portions of the pipeline.
Figure 11B:
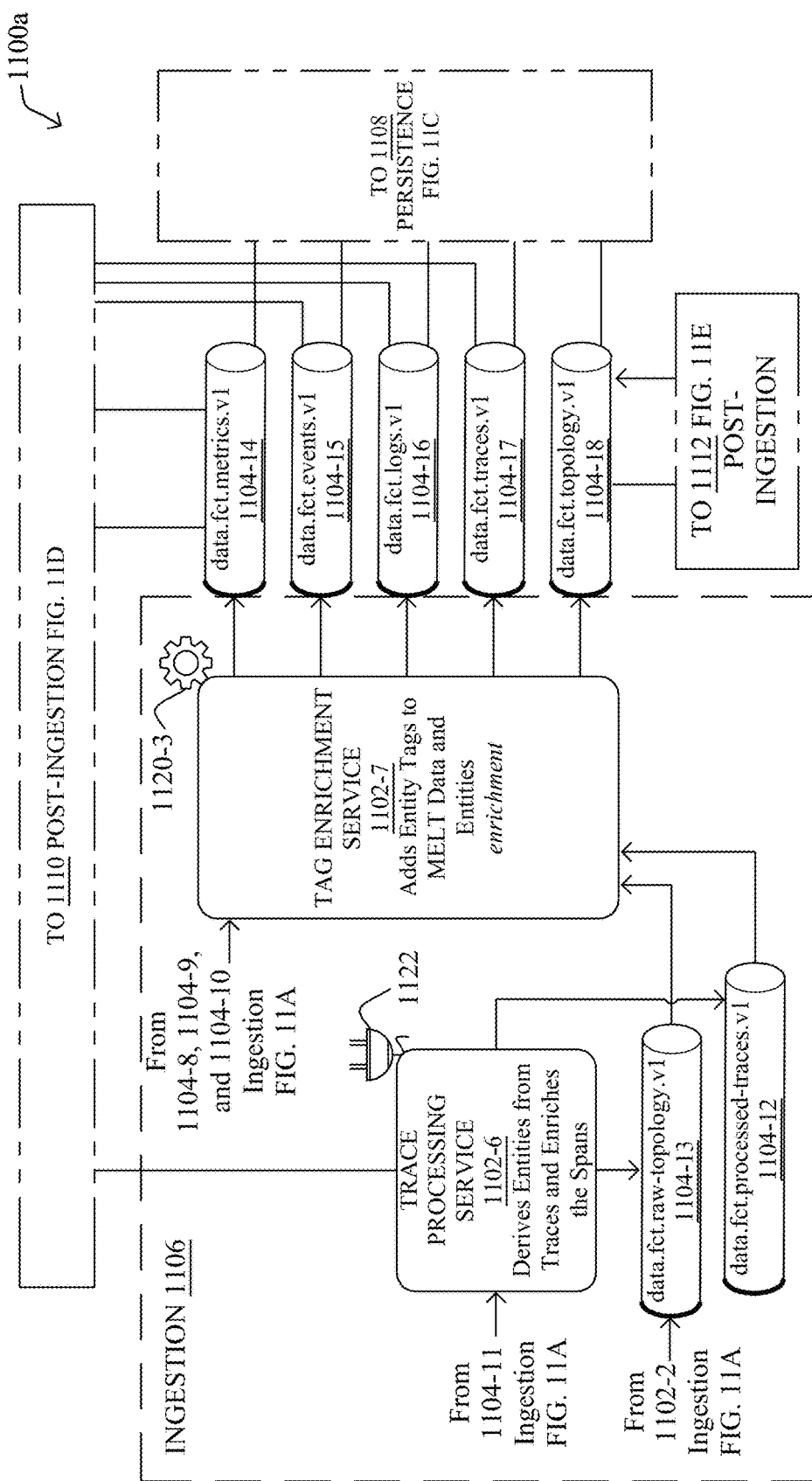
Figure 11C:
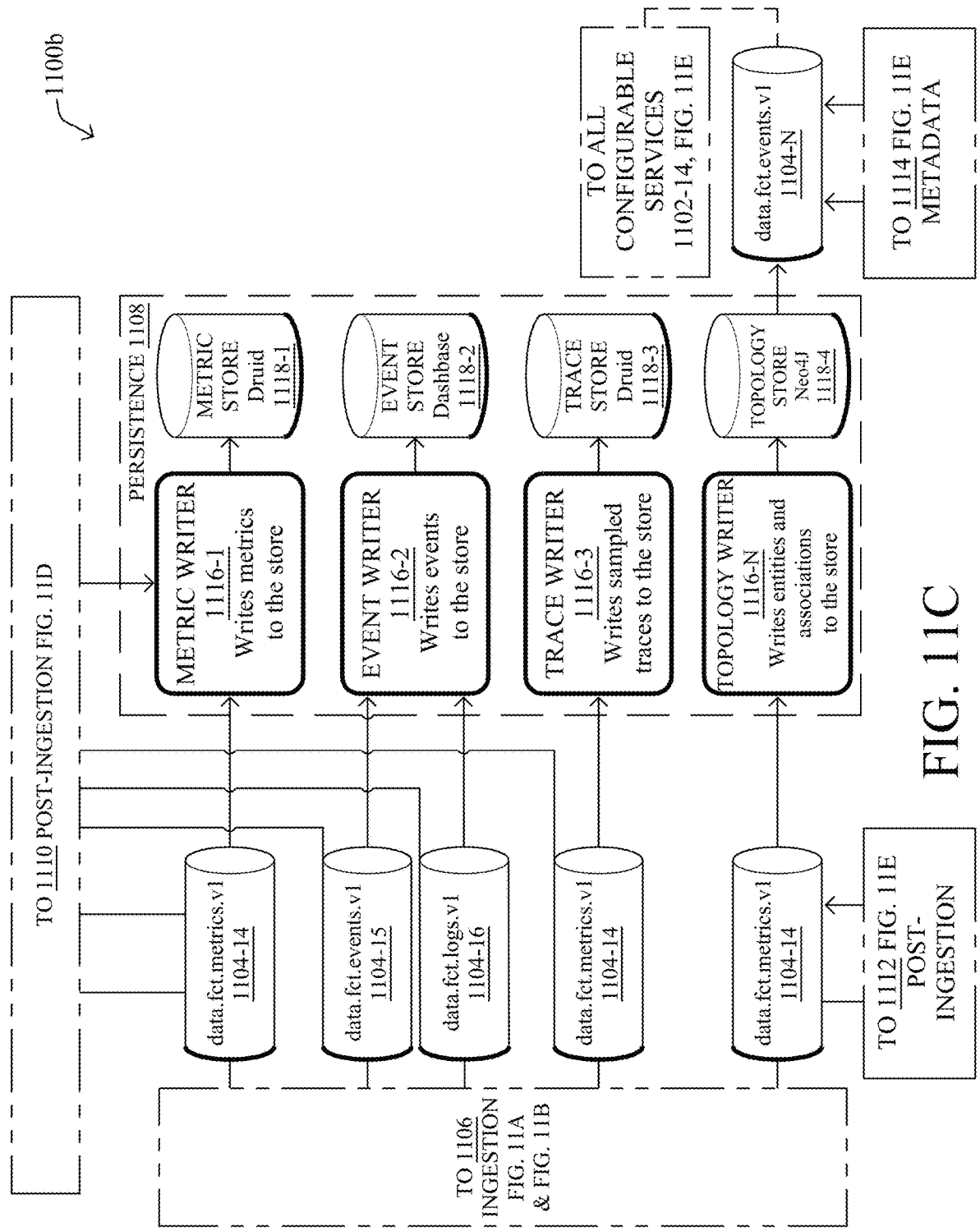
Figure 11D:
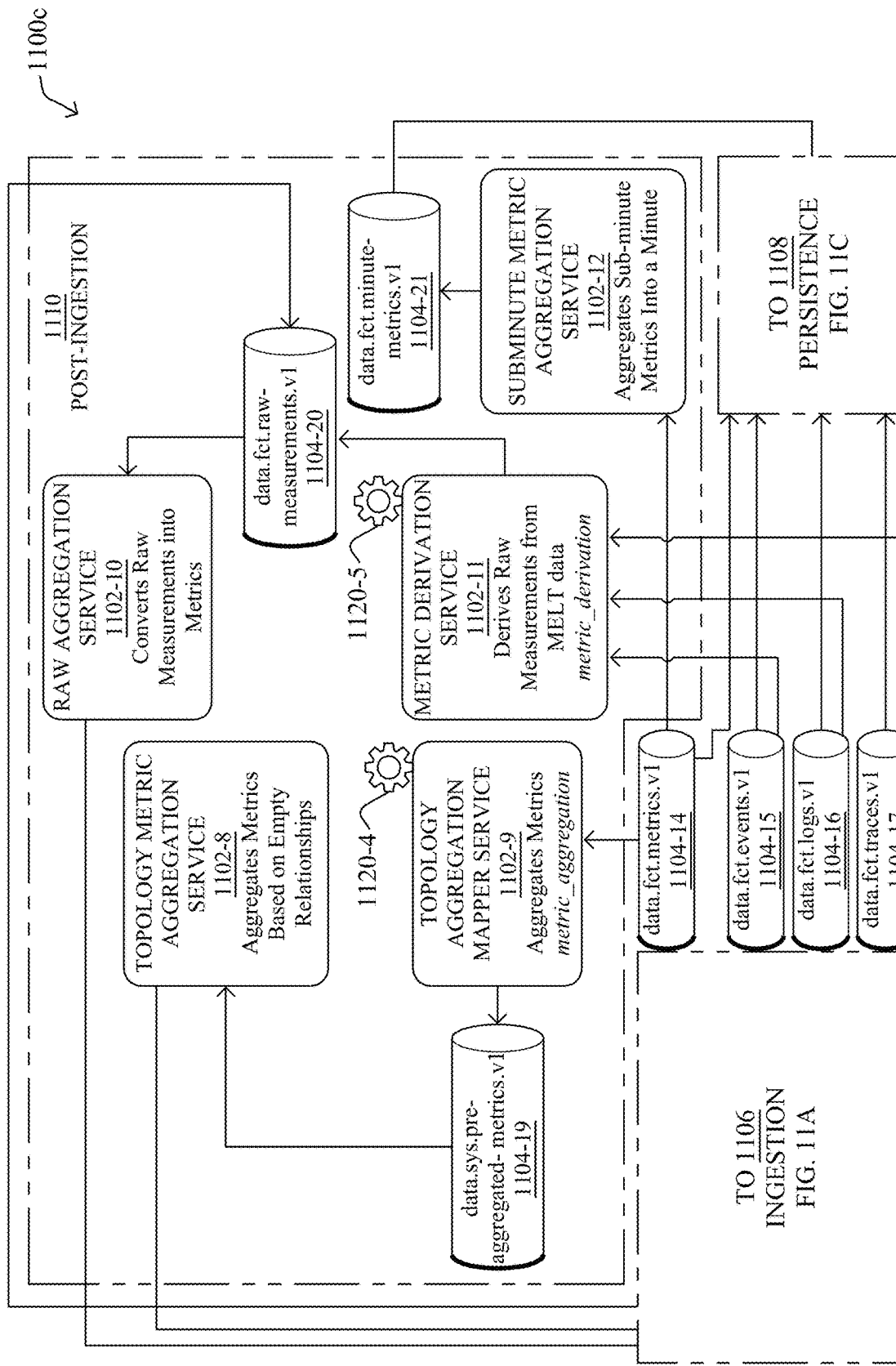
Figure 11E:
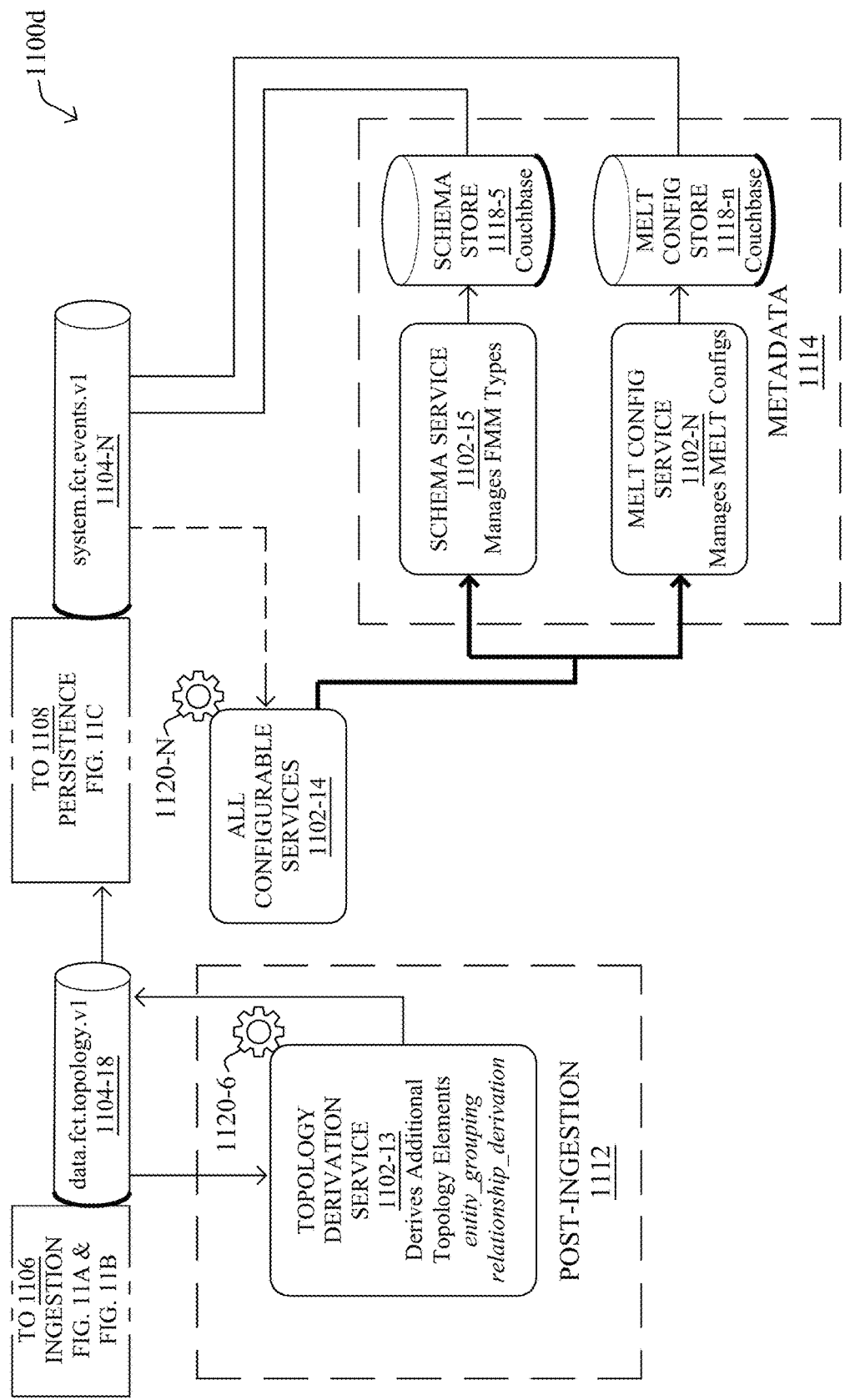

FIGS. 11A-11E illustrate an example of a common ingestion pipeline, e.g., the whole ingestion and transformation process. For clarity purposes, FIGS. 11A-11E each illustrate a respective portion of the entire pipeline. For example, FIGS. 11A-11B collectively illustrate a first quadrant 1100*a* including an ingestion portion 1106 of the pipeline, FIG. 11C illustrates a second quadrant 1100*b* including a persistence 1108 portion of the pipeline, FIG. 11D illustrates a third quadrant 1100*c* including a post-ingestion portion 1110 of the pipeline, and FIG. 11E illustrates a fourth quadrant 1100*d* including a second post ingestion portion 1112 and a metadata portion 1114 of the pipeline. Each of the quadrants may include transformation steps. These transformation steps may take the form of services 1102 (e.g., 1102-1 . . . 1102-N) or of applications 1116 (e.g., 1116-1 . . . 1116-N) which may include a collection of related services. Each of the quadrants may also include data queues 1104 (e.g., 1104-1 . . . 1104-N) (e.g., Kafka topics) that the steps subscribe to and feed into. Steps with a cogwheel symbol 1120 (e.g., 1120-1 . . . 1120-N) may be controlled by configuration objects, which means that they can be configurable extensibility taps adaptable to new domain models by the mere addition or modification of configurations. Steps with a plug symbol 1122 may include pluggable extensibility taps.

For example, the first quadrant 1100*a* may include common ingestion service 1102-1 (e.g., associated with rate limiting, license enforcement, and static validation), resource mapping service 1102-2 (e.g., associated with mapping resources to entities, adding entity metadata, resource_mapping, entity_priority, etc.), metric mapping service 1102-3 (e.g., associated with mapping and transforming OT metrics to FMM, metric_mapping, etc.), log parser service 1102-4 (e.g., associated with parsing and transforming logs into FMM events, etc.), span grouping service 1102-5 (e.g., associated with grouping spans into traces within a specified time window, etc.), trace processing service 1102-6 (e.g., associated with deriving entities from traces and enriching the spans, etc.), and/or tag enrichment service 1102-7 ((e.g., associated with adding entity tags to MELT data and entities, enrichment, etc.).

In addition, this quadrant may include data.fct.ot-raw-metrics.v1 data queue 1104-1, data.fct.ot-raw-logs.v1 data queue 1104-2, data.fct.ot-raw-spans.v1 data queue 1104-3, data.sys.raw-metrics.v1 data queue 1104-5, data.sys.raw-logs.v1 data queue 1104-6, data.sys.raw-spans.v1 data queue 1104-7, data.fct.raw-metrics.v1 data queue 1104-8, data.fct.raw-events.v1 data queue 1104-9, data.fct.raw-logs.v1 data queue 1104-10, data.fct.raw-traces.v1 data queue 1104-11, data.fct.processed-traces.v1 data queue 1104-12, data.fct.raw-topology.v1 data queue 1104-13, data.fct.metrics.v1 data queue 1104-14, data.fct.events.v1 data queue 1104-15, data.fct.logs.v1 data queue 1104-16, data.fct.traces.v1 data queue 1104-17, and/or data.fct.topology.v1 data queue 1104-18.

The second quadrant 1100*b* may include metric writer application 1116-1 (e.g., associated with writing metrics to the metric store 1118-1 (e.g., druid)), event writer application 1116-2 (e.g., associated with writing events to the event store 1118-2 (e.g., dashbase)), trace writer application 1116-3 (e.g., associated with writing sampled traces to the trace store 1118-3 (e.g., druid)), and/or topology writer 1116-N (e.g., associated with writing entities and associations to the topology store 1118-4 (e.g., Neo4J). Additionally, this quadrant may include system.fct.events.v1 data queue 1104-N.

The third quadrant 1100*c* may include topology metric aggregation service 1102-8 (e.g., associated with aggregating metrics based on entity relationships, etc.), topology aggregation mapper service 1102-9 (e.g., associated with aggregating metrics, mertic_aggregation, etc.), raw measurement aggregation service 1102-10 (e.g., associated with converting raw measurements into metrics, etc.), metric derivation service 1102-11 (e.g., associated with deriving measurements from melt data, metric_derivations, etc.), and/or sub-minute metric aggregation service 1102-12 (e.g., associated with aggregating sub-minute metrics into a minute, etc.). Additionally, this quadrant may include data.sys.pre-aggregated-metrics.v1 data queue 1104-19, data.fct.raw-measurements.v1 data queue 1104-20, and/or data.fct.minute-metrics.v1 data queue 1104-21.

The fourth quadrant 1100*d* may include topology derivation service 1102-13 (e.g., associated with deriving additional topology elements, entity_grouping, relationship_derivation, etc.), all configuration services 1102-14, schema service 1102 (e.g., associated with managing FMM types), and/or MELT config service 1102-N (e.g., associated with managing MELT configurations, etc.). In addition, this quadrant may include schema store 1118-5 (e.g., couchbase) and/or MELT config store 1118-N (e.g., couchbase).

Other components and interconnections/relationships may be made in a common ingestion pipeline architecture. The views and products illustrated in FIG. 11A-11E are shown herein merely as example implementations that may be used to provide and/or support one or more features of the techniques herein.

A typical example of rule-driven transformation is the mapping of the Open Telemetry Resource descriptor to an entity in the domain model. The Resource descriptor contains key-value pairs representing metadata about the instrumented resource (e.g., a service) that a set of observed data (e.g., metrics) refers to. The task of the Resource Mapping Service is to identify the entity, which the Resource descriptor describes, and to create it in the Topology Store (which stores entities and their relations) if it isn't known yet.

FIG. 12 illustrates an example of resource mapping configurations 1200. In particular, the three specific examples for a resource mapping configuration are, essentially:

1210: For service instances, copy all matching attribute names to properties and remaining to tags (match by convention);

1220: Copy all attributes starting with "service." to entity properties-copy remaining to tags;

1230: Define specific mappings for entity attribute and tags.

As shown in FIG. 12, an expression "scopeFilter" is used to recognize the input (i.e., records not matching the scope filter are ignored) and "fmmType" assigns an entity type to the resource if it is recognized. The mappings rules then populate the fields of the entity (as declared in the domain model) with content derived from the OpenTelemetry content. Thus the resource mapping configuration refers to, and complements, the domain model, enabling individual tenants to observe and analyze the respective entities in their own system landscape regardless of whether the extensibility platform (e.g., the observability intelligence platform above) supports these entity types as part of the preconfigured ("out of the box") domain models.

The totality of these models and configurations can be considered as one composite multi-level model. Composite in the sense that it has parts coming from different organizations (e.g., the observability intelligence platform distributor, customers, third parties, etc.) and multi-level in the sense that the artifacts drive the behavior of different parts of the whole system, e.g., ingestion, storage, User Interface, etc. Since artifacts refer to each other both across origin and across technical level, the reliable operation of the system heavily relies on the JSON store's ability to understand and enforce the consistency of these references.

For the Trace Processing Service, even more flexibility is required. What is shown as a single box in the diagram is actually itself a workflow of multiple processing steps that need to be dynamically orchestrated depending on the respective domain.

Regarding embedding custom container images and FaaS, in accordance with the techniques herein, especially in the complex trace processing workflows, but also in pre-ingestion processing (such as the enrichment of observed data with geographic information derived from IP addresses), some required transformations are too sophisticated for generic rule-driven algorithms. In such cases, the customer must be able to provide their logic as a function that can be executed as a service (e.g., a FaaS) or even a container image exposing a well-defined service interface.

Note that where custom functions are running external to the extensibility platform, the corresponding secrets to access them need to be made available to calling services.

Another security-related problem coming with custom services is that their access may need to be restricted based on user roles. One solution to this is to use custom representational state transfer (REST) endpoints and extensible role-based access control (RBAC) for an extensibility platform.

The extensibility platform herein also illustratively uses a graph-based query engine. In particular, an important precondition for the configuration-driven consumption of customer-specific content is the ability to query data via a central query engine exposing a graph-based query language (as opposed to accessing data via multiple specific services with narrow service interfaces).

Figure 13:
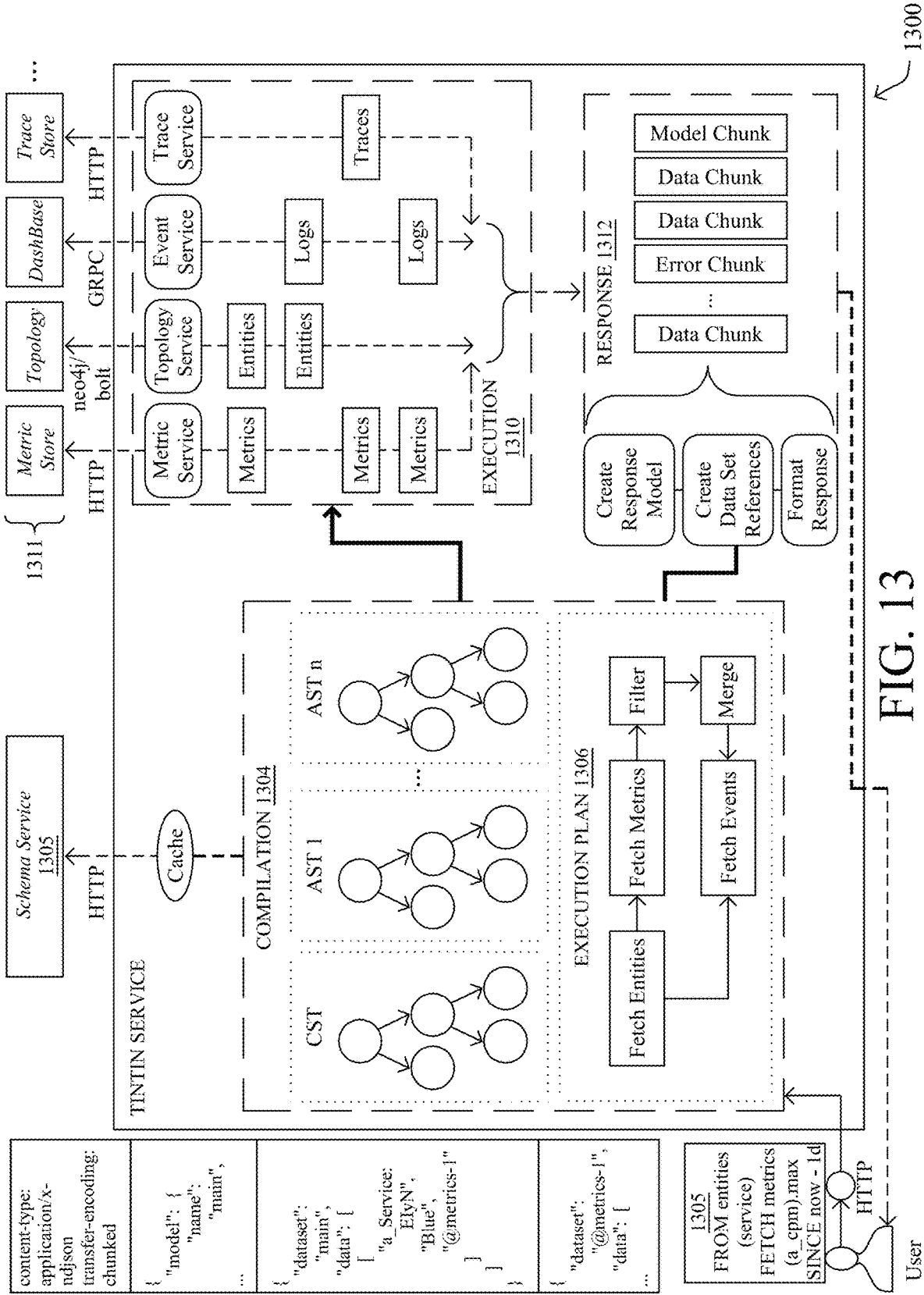
FIG. 13 illustrates an example of a design of a Unified Query Engine (UQE)

FIG. 13 illustrates an example of a design of a Unified Query Engine (UQE) 1300. The Unified Query Engine 1300, in particular, provides combined access to:

Topology (Entities and their relationships);

Metrics;

Events;

Logs; and

Traces.

The Unified Query Engine 1300 may provide the combined access by receiving a fetch request 1302, performing compilation 1304 and determining execution plan 1306. In addition, Unified Query Engine 1300 may execution 1310 and response 1312. Results of performing compilation 1304 and/or execution plan 1306 may be cached with schema service 1305. Results of execution 1310 may be stored in observability stores 1311 which may include a metric store, a topology store, a DashBase store, a trace store, etc. For example, the topology data may be stored in a graph database, and the unified query language (UQL) may allow the platform to identify sets of entities and then retrieve related data (MELT) as well as related entities. The ability to traverse relationships to find related entities enables the application of graph processing methods to the combined data (entities and MELT).

The extensibility platform herein also uses a Configuration-Driven User Interface. In order to allow customers and third parties to create domain-specific UIs without deploying code, the UI is built according to the following principles:

1. No domain knowledge is hard-coded into any UI components.

In particular, no references whatsoever to FMM model content occur in the UI code.

2. Domain knowledge is modeled into UI configurations.

The appearance of the UI, as far as it is domain-specific, is determined by declarative configurations for a number of predefined building blocks.

3. Uniform modeling approach, reusable configurations.

Regardless of the page context (Dashboard, Object Centric Pages (OCP), etc.), the same things are always configured in the same way. Existing configurations can be reused in different contexts. Reusable configurations declare the type of entity data they visualize, and reuse involves binding this data to a parent context.

4. Dynamic selection of configurations.
   On all levels, configurations can be dynamically selected from multiple alternatives based on the type (and subtype) of the data/entity to which they are bound. The most prominent example is the OCP template, which is selected based on the type of the focus entity (or entities).
5. Nesting of configurable components, declarative data binding.
   Some components can be configured to embed other components. The configurations of these components declare the binding of their child components to data related to their own input. No extension-specific hard-coded logic is required to provide these components with data. This gives third parties enough degrees of freedom to create complex custom visualizations.
6. Limited Interaction Model.
   In contrast to the visualization, third parties have limited ways to influence the behavior of the application. The general Human Computer Interaction mechanics remain the same for all applications. For example, it is possible to select the "onclick" behavior for a component out of a given choice, e.g., drilldown, set filter, etc.

The extensibility platform herein also uses a Cell-based Architecture. That is, the extensibility platform herein is a cloud-native product, and it scales according to a cell-based architecture. In a cell architecture, in particular, the "entire system" (modulo global elements) is stamped out many times in a given region. A cell architecture has the advantages of limiting blast radius (number of tenants per cell affected by a problem), predictable capacity and scalability requirements, and dedicated environments for bigger customers.

Figure 14:
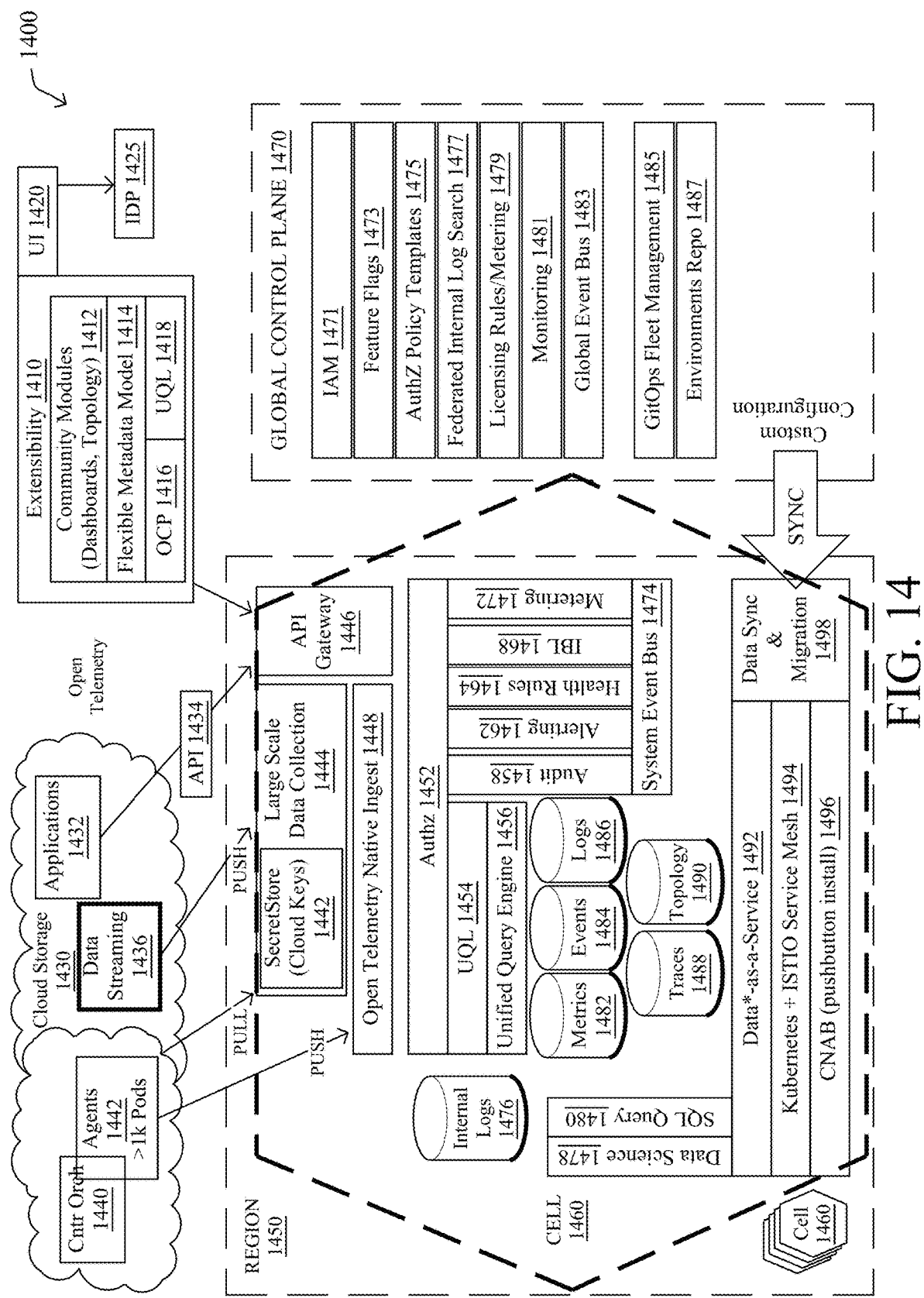
FIG. 14 illustrates an example of a deployment structure of an observability intelligence platform in accordance with the extensibility platform herein, and the associated cell-based architecture.

FIG. 14 illustrates an example of a deployment structure of an observability intelligence platform in accordance with the extensibility platform herein, and the associated cell-based architecture. As shown in extensibility platform diagram 1400, an extensibility platform 1410 has community modules 1412 (dashboards, topology), a flexible meta model (FMM) 1414, an OCP 1416, and a UQL 1418. A UI 1420 interfaces with the platform, as well as an IDP (Identity Provider) 1425. Cloud Storage/Compute 1430 has various Applications 1432 (and associated APIs 1434). as well as Data Streaming services 1436. A Container Orchestration Engine 1440 (e.g., K8s) may have numerous deployed Agents 1442. The MELT data is then pushed or pulled into a particular Region 1450 and one or more specific Cells 1460. Each cell may contain various features, such as, for example:
SecretStore (cloud keys) 1442, Large Scale Data Collection 1444
API Gateway 1446
Open Telemetry Native Ingest 1448
AuthZ (authorization) 1452
UQL 1454
Unified Query Engine 1456
Audit 1458
Alerting 1462
Health Rules 1464
IBL 1468
Metering 1472
System Event Bus 1474
Internal Logs 1476
Data Science 1478
SQL Query 1480
Metrics 1482
Events 1484
Logs 1486
Traces 1488
Topology 1490
data-as-a-service 1492
Kubernetes+ISTIO Service Mesh 1494
CNAB (pushbutton install) 1496
Data Sync & Migration 1498
Etc.

Global control plane 1470 may also contain a number of corresponding components, such as, for example:
IAM (Identity and Access Management) 1471
Feature Flags 1473
Authz Policy Templates 1475
Federated Internal Log Search 1477
Licensing Rules/Metering 1479
Monitoring 1481
Global event bus 1483
GitOps fleet management 1485
Environments Repository 1487
Etc.

Note that the global control plane 1470 passes Custom Configurations to sync into the Cell 1460 (data sync & migration), as shown.

The description below provides greater details regarding the Cell-Based Architecture.

Note that a specific challenge in certain configurations of this model may include the balancing of resources between the multiple tenants using a cell, and various mechanisms for performing service rate limiting may be used herein.

The description below also provides greater details regarding the Service Rate Limiting in Cells.

Another specific challenge in this model is in regard to disaster recovery. Again, various mechanisms for disaster recovery may be used herein, as well.

The techniques described herein, therefore, provide for an extensibility platform, and associated technologies. In particular, the techniques herein provide a better product to customers, where more features are available to users, especially as feature development is offloaded from a core team to the community at-large. The extensibility platform provides a clean development model for first party apps (e.g., EUM, Secure App, etc.) and second party apps (e.g., observability, etc.), enabling faster innovation cycles regardless of complexity, particularly as there is no entanglement with (or generally waiting for) a core team and roadmap. The techniques herein also enable a software as a service (SaaS) subscription model for a large array of features.

Figure 15A:
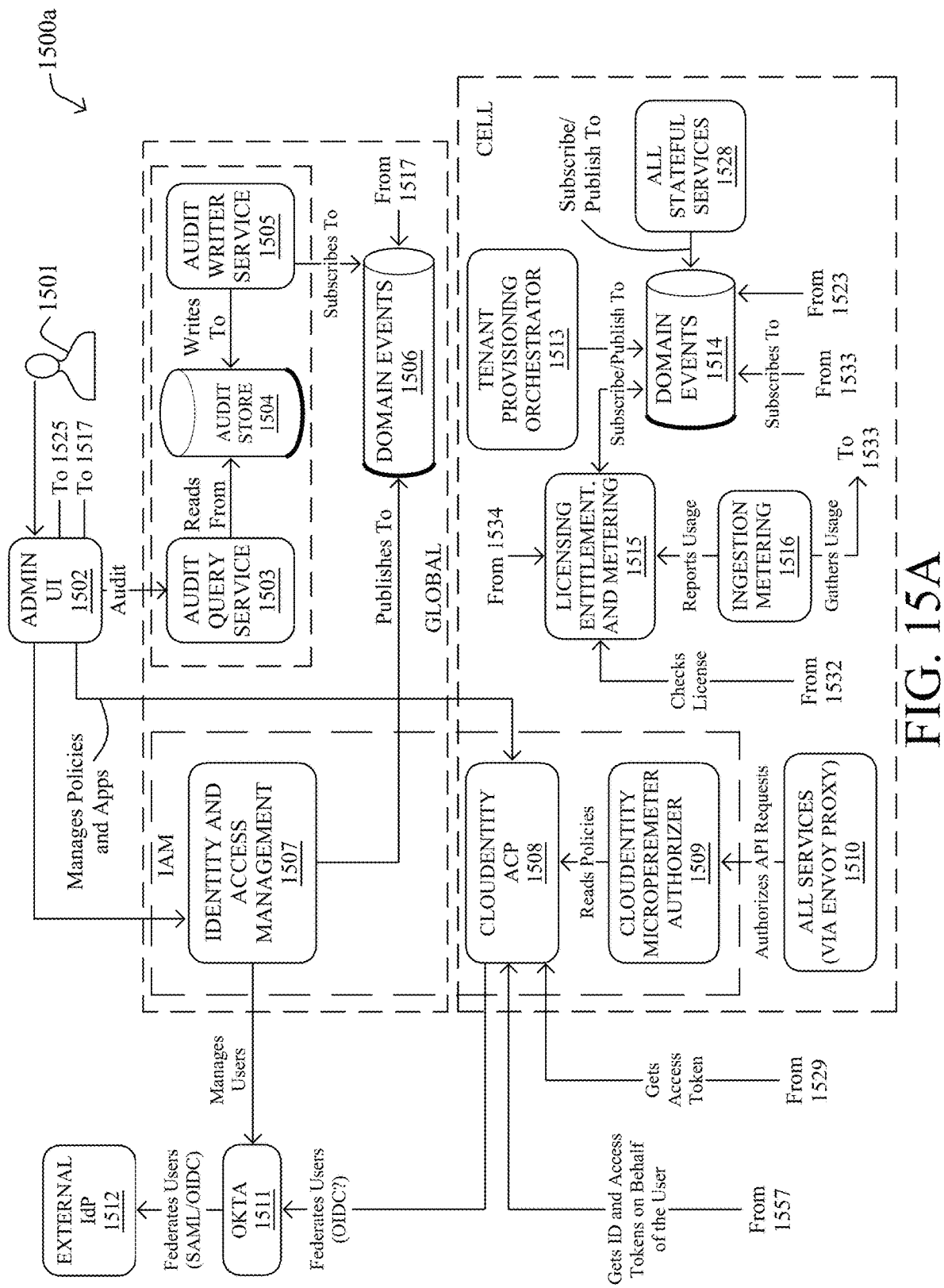
FIGS. 15A-15D illustrate an example of a system for utilizing a configuration-driven data processing pipeline for an extensibility platform, in particular where each of FIGS. 15A-15D illustrate respective quadrants of the system.
Figure 15B:
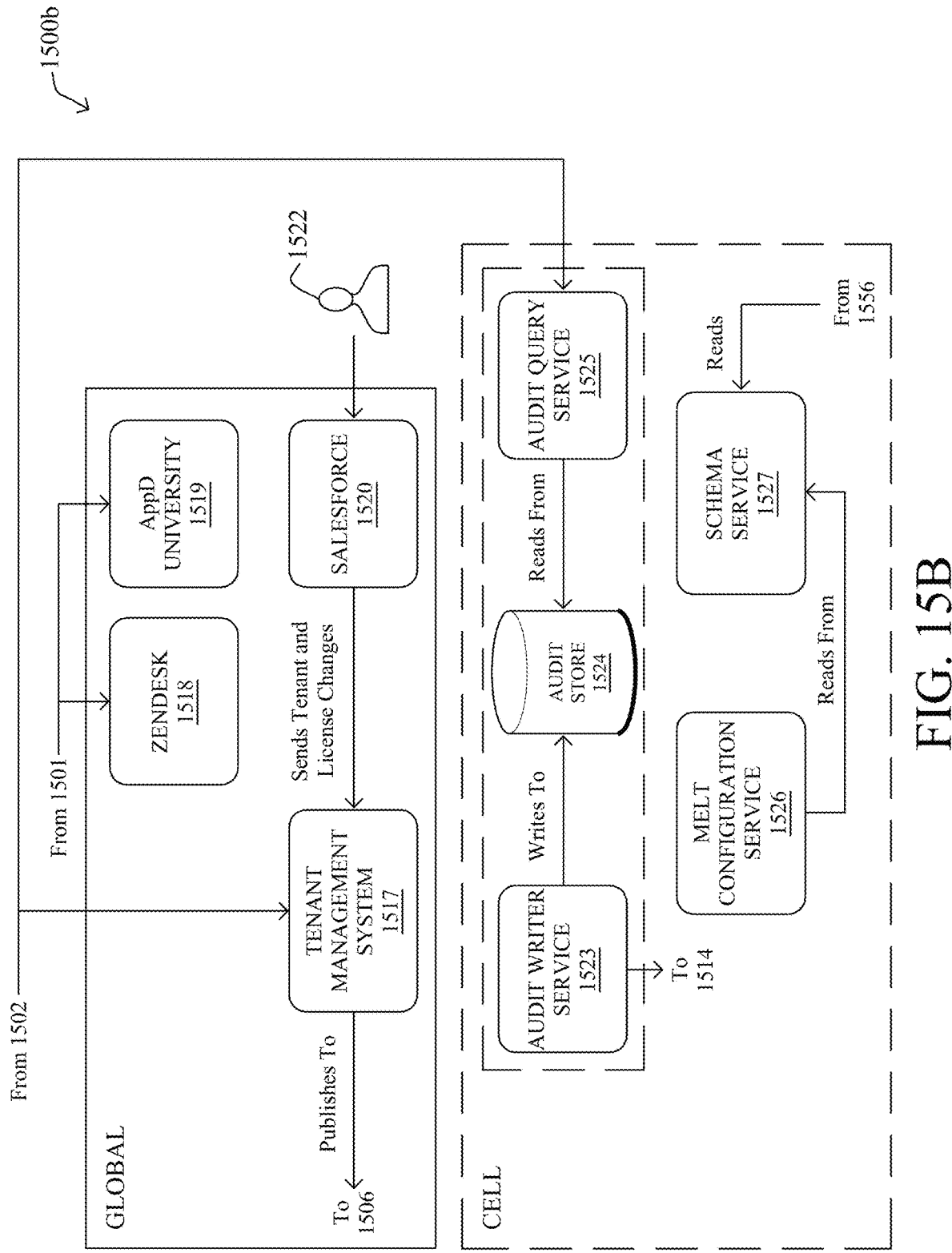
Figure 15C:
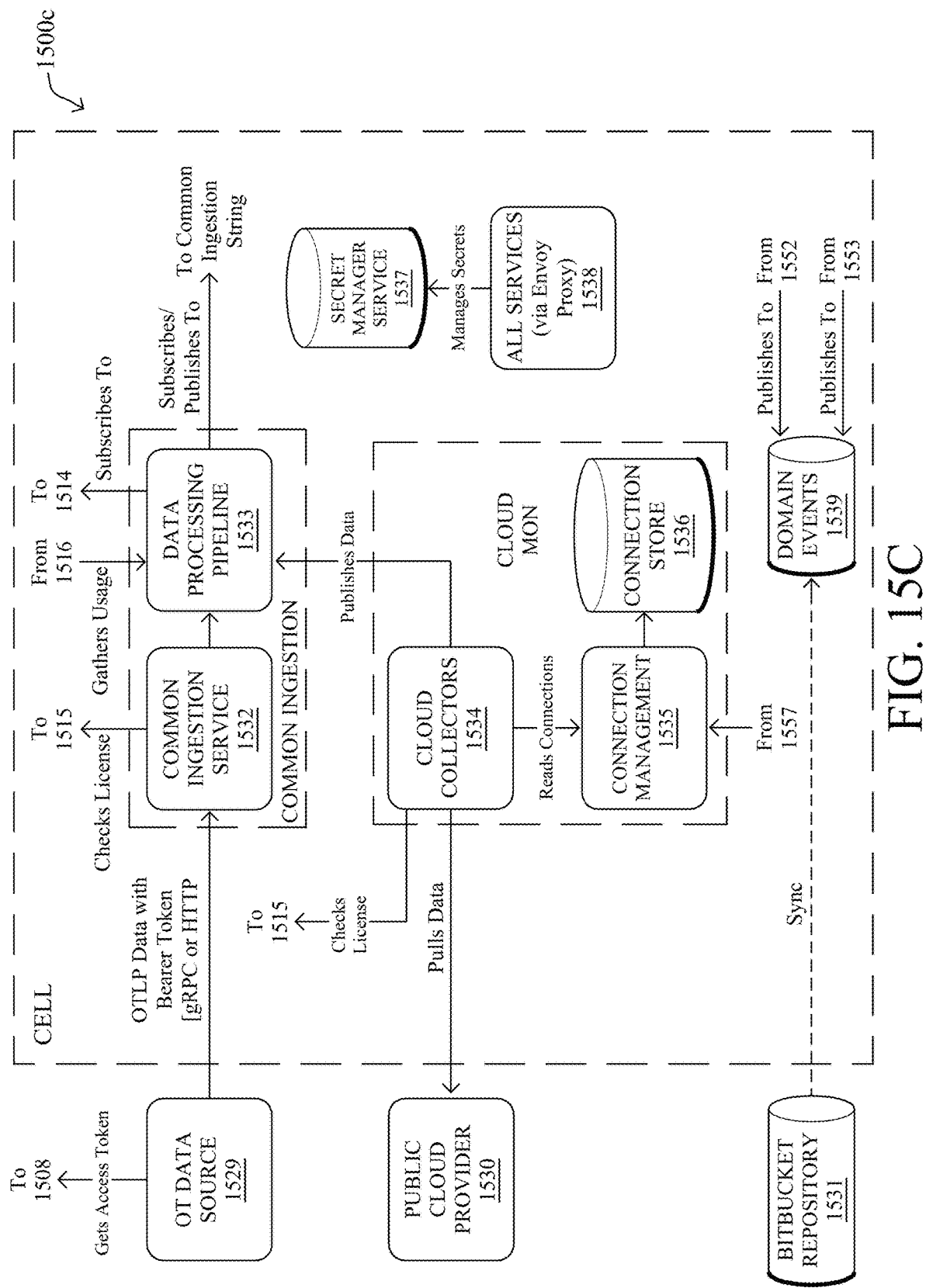
Figure 15D:
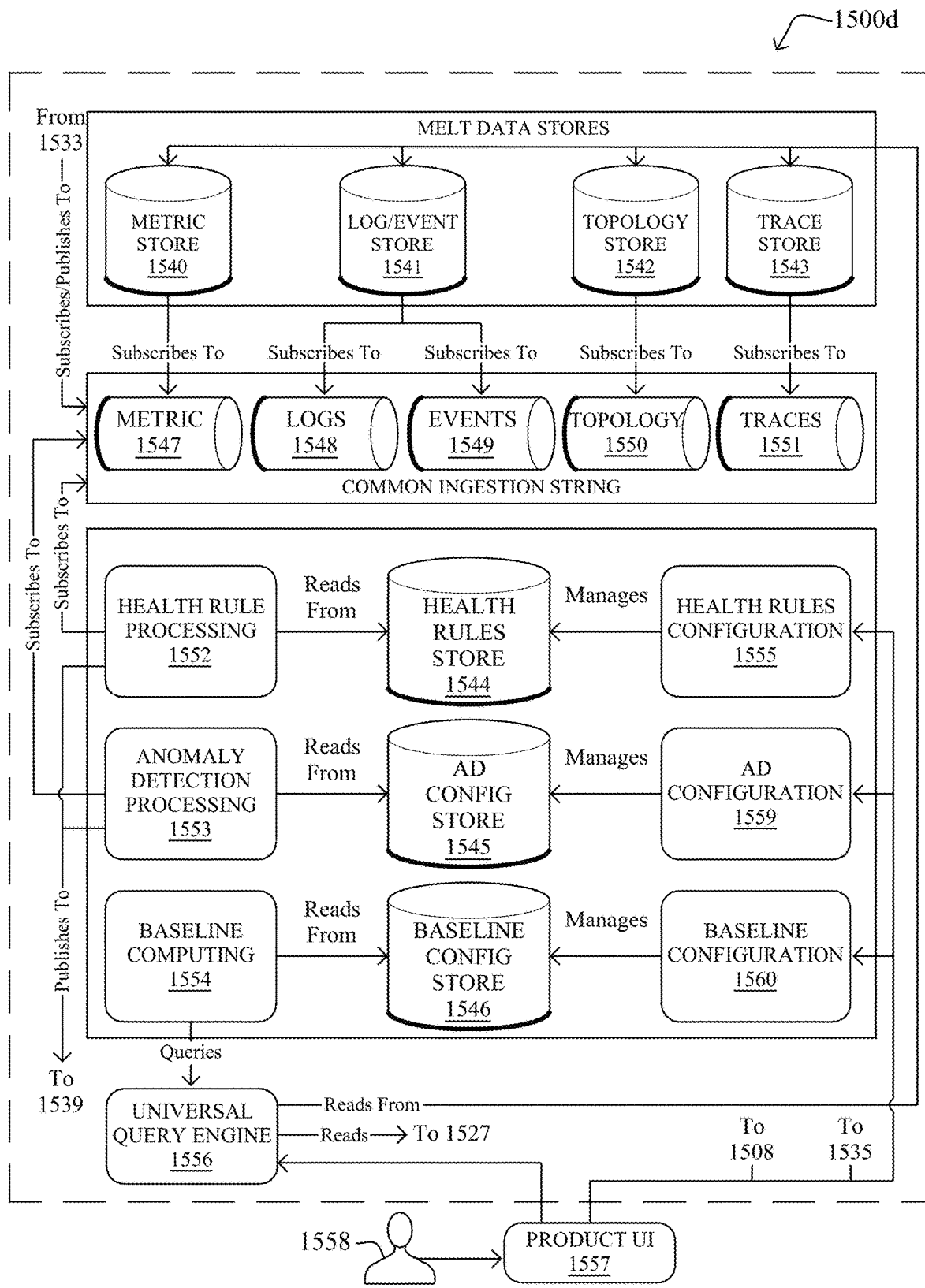

FIGS. 15A-15D illustrate another example of a system for utilizing an extensibility platform. For clarity purposes, FIGS. 15A-15D each illustrate a respective quadrant of the entire system. For example, FIG. 15A illustrates a first quadrant 1500a of the system, FIG. 15B illustrates a second quadrant 1500b of the system, FIG. 15C illustrates a third quadrant 1500c of the system, and FIG. 15D illustrates a fourth quadrant 1500d of the system.

The system may receive input from a customer and/or admin 1501 of the system. via an admin user interface 1502. The system may include a global portion. This global portion may include an audit component. The audit component may include an audit query service 1503 that may allow the querying of an audit log, an audit store 1504 (e.g., dashbase), and/or an audit writer service 1505 that may populate the audit store 1504. In addition, the global portion may include Zendesk 1518 or another component that will support requests, "AppD university" 1519 or another component that will manage training material and courses, salesforce 1520 or another component that allows management of procurement and billing, and/or a tenant management system 1517 for managing tenant and license lifecycle. An "AppD persona" 1522 may interact with salesforce 1520. The global portion may additionally include domain events 1506 for global domain events and identity and access management 1507 that facilitates management of users, application, and their access policies and configure federation.

The system may also include external IdP 1512 which may include a SAML, OpenIS or OAuth2.0 compliant identity provider. The system may include Okta 1511 which may include an identity provider for managed users. In addition, the system may interface with OT data source 1529 which may act as an OT agent/collector or a modern observability agent. In various embodiments, the system may interface with public cloud provider 1530 such as AWS, Azure, GCP, etc. The system may also include BitBucket repository 1531 to produce configs and/or models as code.

In addition to the global portion, the system may also include a cell portion. The cell portion may include a cloudentity ACP 1508 which may operate as an openID provider, perform application management, and/or perform policy management. Further, the cell portion may include cloudentity microperemeter authorizer 1509 for policy evaluation. Furthermore, the cell may include all services 1510 via envoy proxy.

The cell portion may include a second audit component which may include a second audit query service 1525, a second audit store 1524, and/or a second audit writer service 1523. The cell portion may also include a second domain event 1514 for cell domain events. Further, the cell portion may include a tenant provisioning orchestrator 1513, an ingestion meter 1516 that meters ingestion usage, and/or a licensing, entitlement, and metering manager 1515 that facilitates queries of licensing usage, performs entitlement checks, and/or reports on usage. Again, the cell portion may include all stateful services 1528.

The cell portion may include a common ingestion component. The common ingestion component may include data processing pipeline 1533 which may validate and transform data. Data processing pipeline 1533 may also enrich entities and MELT based on configurations. The common ingestion component may also include common ingestion service 1532, which may authenticate and/or authorize requests, enforces licenses, and/or validate a payload.

Moreover, the cell portion may include a common ingestion stream component. The common ingestion stream component may include metrics 1547 (e.g., typed entity aware metrics), logs 1548 (e.g., entity aware logs), events 1549 (e.g., typed entity aware events), topology 1550 (e.g., typed entities and associations), and/or traces 1551 (e.g., entity aware traces). In addition, the cell portion may include a MELT data stores components that includes metric store 1540 (e.g., druid), log/event store 1541 (e.g., dashbase), topology store 1542 (e.g., Neo4j), and/or trace store 1543 (e.g., druid).

In various embodiments, the cell portion of the system may include a cloudmon component, which may include cloud collectors 1534 that collect data from public cloud providers 1530. Additionally, the cloudmon component may include connection management 1535, which may facilitate management of external connections and their credentials. In some instances, the cloudmon component may include a connection store 1536 (e.g., postgreSQL).

The cell portion may also include an alerting component. The alerting component may include a health rule processor 1552 for evaluating health rules and generating entity health events. Further, the alerting component may include a health rule store 1544 (e.g., mongo DB) and/or a health rule configuration 1555 that facilitates the management of health rules. Likewise, the altering component may include an anomaly detection processor 1553 to detect anomalies and/or publish their events, an anomaly detection config store 1545 (e.g., mongoDB), and/or an anomaly detection configuration 1559 that facilitates enabling/disabling/providing feedback for anomaly detection. The alerting component may also include a baseline computer 1554 for computing baselines for metrics, a baseline config store 1546 (e.g., mongoDB), and/or a baseline configuration 1560 to facilitate configuration of baselines.

The cell portion may include a secret manager service 1537 (e.g., HashiCorp Vault) exposed to all services 1538 via envoy proxy. The cell portion may include a third domain event 1539 for cell domain events. In addition, the cell portion of the system may include a universal query engine 1556 that may expose a query language for ad-hoc queries. An end user 1558 may interface with universal query engine 1556 over a product user interface 1557. In addition, the universal query engine 1556 may read from schema service 1527. Schema service 1527 may facilitate querying and management of FMM types. Furthermore, MELT configuration service 1526 may perform configuration of data processing pipeline 1533.

Other components and interconnections/relationships may be made in a example extensibility platform herein, and the views and products illustrated in FIG. 15A-15D are shown herein merely as example implementations that may be used to provide and/or support one or more features of the techniques herein.

Cell-Based Architecture

The techniques herein extend and/or support the extensibility platform described above by providing a Cell-Based Architecture component for the platform.

Regarding the Cell Model, the extensibility platform diagram 1400 of FIG. 14 above shows that a region is subdivided into cells. In a cell architecture, the "entire system" (modulo global elements) is stamped out many times in a given region. A cell is a collection of components, grouped from design and implementation into deployment. A cell is independently deployable, manageable, and observable. This is because cells may:

Limits blast radius (number of tenants per cell affected by a problem).
Have predictable capacity and scalability requirements.
Provide dedicated environments for bigger customers.

A cell architecture effectively enjoys repeatable deployment and software development frameworks (e.g., via GitOps), by virtue of the fact that even within a region hundreds of cells are stamped out.

Figure 16:
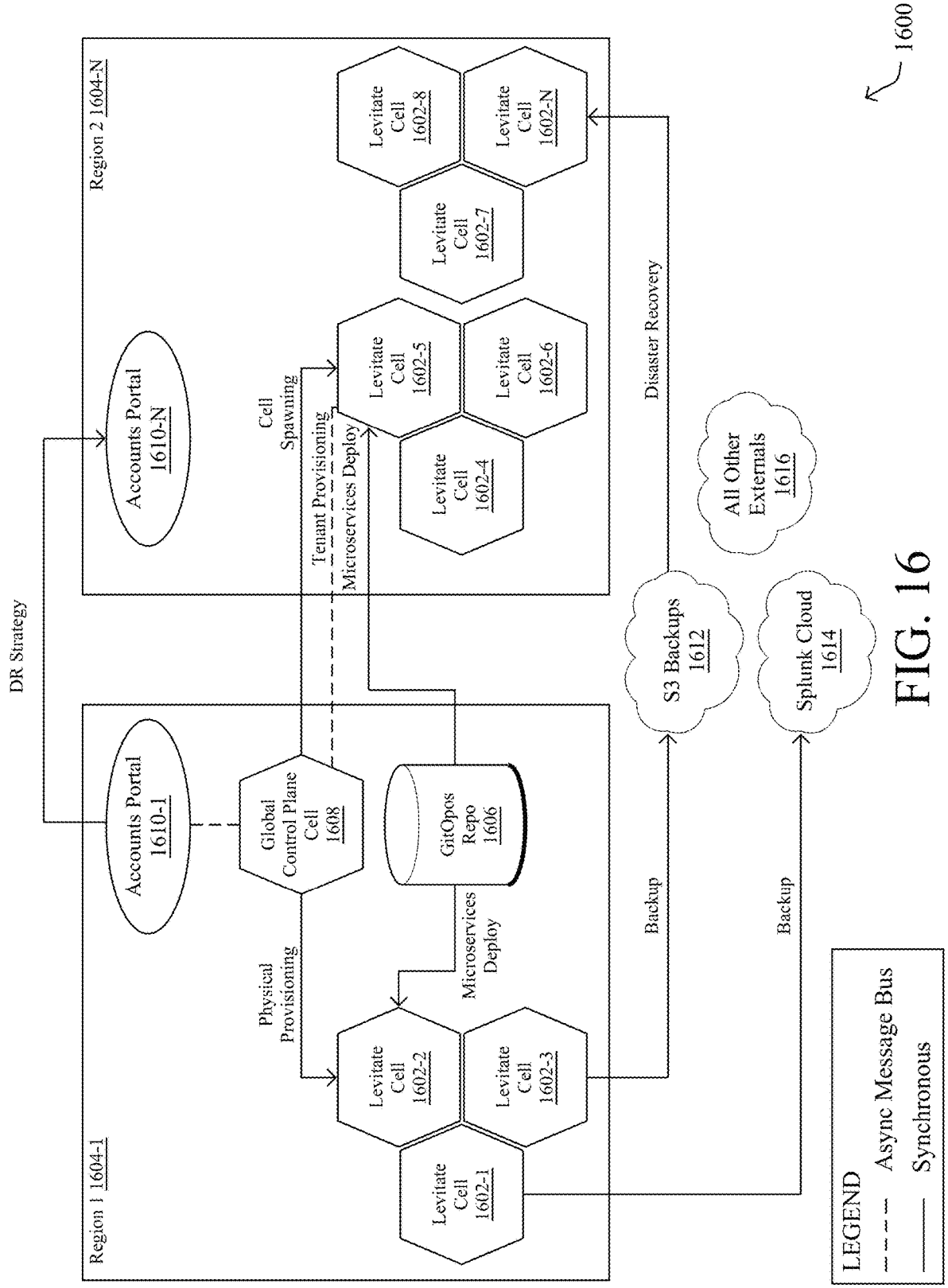
FIG. 16 illustrates an example of the overall architecture of cells.

FIG. 16 illustrates an example of the overall architecture 1600 of cells 1602 (e.g., 1602-1 ... 1602-N). As previously described, cells 1602 may be subdivisions of a region 1604 (e.g., 1604-1 ... 1604-N). Cells 1602 (aka "Levitate Cells") may be totally isolated from each other. There is no network connectivity between cells 1602. Global (shared) system components exist for features like account management and cell spawning. The global cell, like every cell 1602 contains a kafka bus. The non-global cells are allowed to connect to the global cell's kafka domain event topic via a transit gateway for the purpose of receiving command and control from the global.

For example, a region 1604 may include a repository 1606 (e.g., GitOps repository) which may be utilized for microservices deployment. In addition, a region 1604 may include a global control plane cell 1608. The global control plane cell 1608 may be involved in physical provisioning, cell spawning, tenant provisioning, etc. In addition, global control plane cell 1608 may interface with one or more account portal 1610 (e.g., 1610-1 . . . 1610-N). Architecture 1600 may also include a storage solution 1612 (e.g., S3 backups) which may be involved in backup and/or disaster recovery. Further, architecture 1600 may include a data management cloud 1614 (e.g., Splunk Cloud) which may be involved with log collection, storage, analysis, etc. from cells 1602. The architecture 1600 may also include all other externals 1616.

Figure 17:
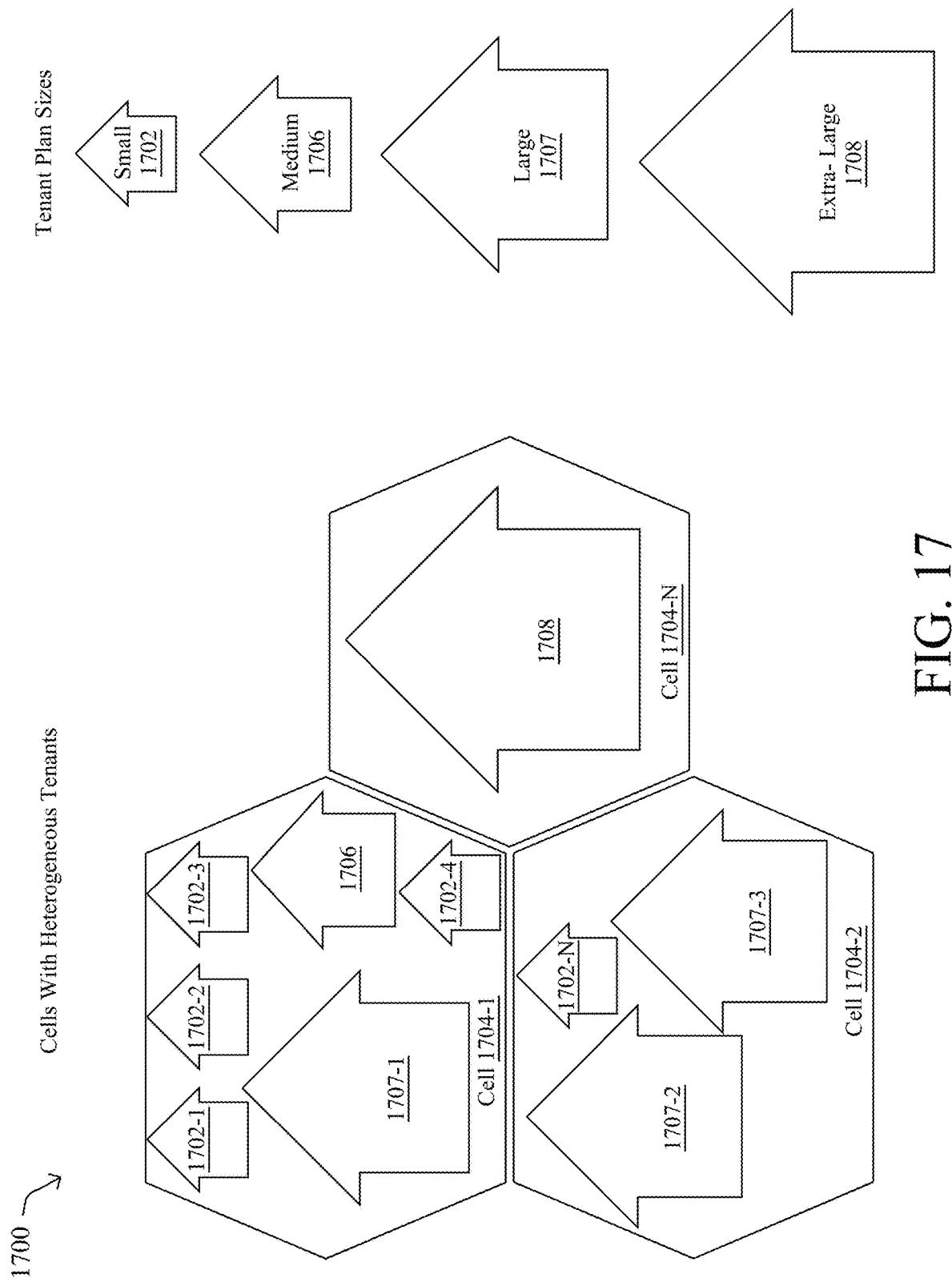
FIG. 17 illustrates an example diagram that shows cells of a certain capacity packed with tenants of different sizes.

Regarding MultiTenancy, the tenancy model for extensibility platform cells requires identifying tenants based on a maximum quantity of system resources that the cell will allow the tenant to consume. Therefore, the techniques herein label tenants with a "plan_size". The cell must enforce Service Rate Limits on ingest, as well as resource consumption limits based on the tenant's plan size. The tenant's plan size may be characterized as small sized plan 1702 (e.g., 1702-1 . . . 1702-N), a medium sized plan 1706, a large sized plan 1707 (e.g., 1707-1 . . . 1707-N), an extra-large sized plan 1708, or by any other distinguishing characteristic or label associated with a relative size of the plan. This means that a tenant cannot consume more resources than allowed by their current plan size. FIG. 17 illustrates an example diagram 1700 that shows cells 1704 (e.g., 1704-1 . . . 1704-N) of a certain capacity packed with tenants of different sizes (e.g., cells 1704 with heterogeneous tenants).

Since tenants grow, cells need to be able to grow too. However, since certain embodiments of datastores do not support truly fine-grained elasticity, the techniques herein may illustratively expand cells according to a step function in which cells will "upgrade" from small to medium, from medium to large, and so forth. The actual expansion is accomplished by growing each of the underlying datastores and message busses.

Figure 18:
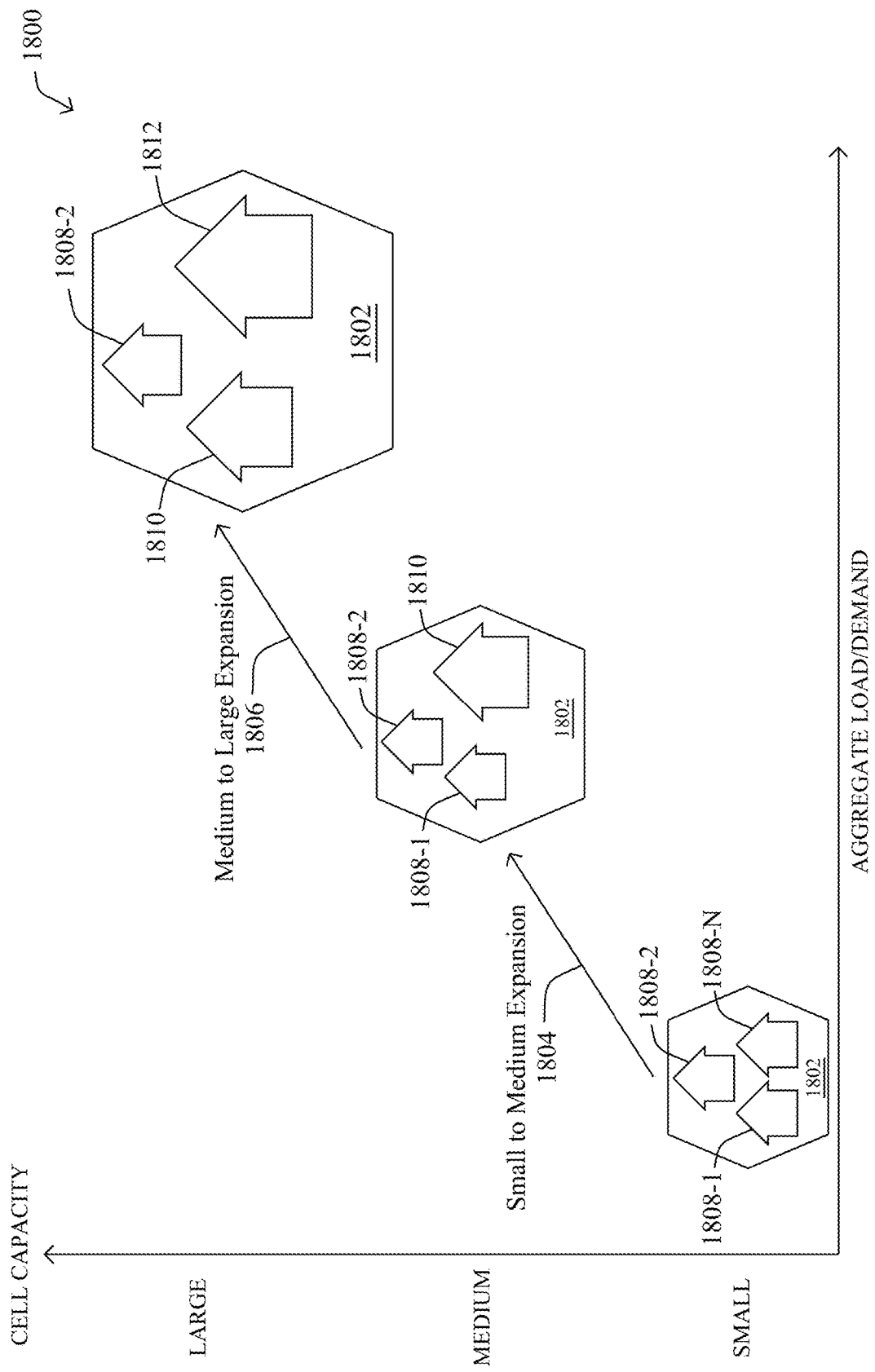
FIG. 18 illustrates an example of step function tenant cell expansion according to certain embodiments herein.

FIG. 18 illustrates an example 1800 of step function tenant cell expansion according to certain embodiments herein. In example 1800, a cell 1802 may be expanded by expansion of its tenant plan sizes. For example, a cell 1802 may first have only small sized tenant plans 1808 (e.g., 1808-1 . . . 1808-N). Then a small to medium expansion 1804 may be performed where at least one of the small size tenant plans 1808 are expanded to a medium sized tenant plan 1810. Then a medium to larger expansion 1806 may be performed where another at least one of the small sized tenant plans 1808 is expanded so that the cell 1802 has a small sized tenant plan 1808, a medium sized tenant plan 1810, and a large sized tenant plan 1812.

Note that cell expansion is a non-trivial process. Datastores that upgrade their node count typically need data rebalancing. For this reason, cell expansion is a carefully automated process where the order of datastore upgrades is important. A complete cell upgrade might be a 24-hour process.

Also note that in certain embodiments, there is no way to move tenants. Moving a tenant can be necessary when a tenant is an order of magnitude larger or faster growing than its neighbors. In this case it is necessary to move the tenant to a dedicated cell (or conversely to move all the small tenants to another cell leaving the large tenant in place). The rough outline of tenant movement is to use a selective, tenant-aware cell restore from a disaster recovery backup.

Authentication and authorization for cells can happen through standard OAuth or OIDC workflows.

All cells will be allocated into the extensibility platform production cloud-services account. Depending on the centrality of the customer account the account will be provisioned to the appropriate region.

In the extensibility platform global cell a cell provisioning service will be listening for events on the service bus to trigger a new cell deployment in a specific region. Cell provisioning includes laying down the minimum amount of infrastructure needed to begin pull based deployment with flux. Cell Management provides ways to scale a cell resources and manage underlaying components, namely cell management and cell provisioning.

Cell bootstrapping is the process by which a cell prepares itself to be "ready" to register.

Cell registration and tenant provisioning is the process by which the global control plane keeps track of cells and assigns tenants.

Regarding cell registration and tenant provisioning in ephemeral environments, an ephemeral CI environment is a minimal cell deployment required for a service to perform integration testing. In one embodiment, the techniques herein may use a simple account simulator which will emit a test tenant creation event to the global event bus, so the services can consume the event and provision everything needed for the tenant. Alternatively, a service team may configure their data stores on a deployment to CI Environment only.

The techniques herein also provide a datastore design, where instead of expecting a datastore to scale nearly limitlessly horizontally, a Cell can instead be statically provisioned with datastores that are not expected to scale horizontally. Rather, the datastores are expected to be "large enough" to accommodate a certain quantity of reads and writes, which can be backed out of a requirement such as "A cell will hold up to 250 customers".

Note, for example, that an illustrative extensibility platform cell is a deployable unit that holds 250 tenants (e.g., using a dedicated Kafka cluster), and connects (internally, or to the cloud) to datastores that are shared with no other cell. Datastores in a cell should have a fixed, and pre-provisioned shape (e.g. neo4j 3-core-server replication), and datastores in a cell can choose the most appropriate configuration (horizontal or vertical scaling) to meet the different size requirements As an example of how this simplifies datastore design, in one example test case, the test identified a 3-core-server deployment model. The replication model does not yet allow replication factor to be set. All data is replicated to all nodes. A 3 core-server cluster replicates each tenant to all 3 nodes. A 100 core server cluster replicates each tenant to 100 nodes. This means that even expanding the neo cluster horizontally has diminishing returns for simple topologies. Instead, to scale horizontally, one would have to map tenants to separate clusters, within a cell. This is all very complex, with tenant-to-database routing policies.

The datastore scaling model is simplified when we make the Cell itself the unit of scaling. Instead of complex horizontal datastore scaling, the techniques herein simply stamp out a new Cell when 250 customers have been populated into the cell.

Tenant growth is accommodated by scaling each of the datastores. Datastores can either scale horizontally, vertically, or both. Database scaling is not expected to be "continuous". Rather, datastores are expected to support three discrete "sizes" (small, medium, and large). One approach to guide how a datastore should determine its small, medium, and large sizes is for a team to build a load generator and benchmark the performance of their store under read and write loads that they believe typify small, medium, and large workloads. Notably:

- Each datastore must support "small", "medium" and "large" configurations
- Each datastore must provide a scaling operator. The declarative config for the scaling operator will state only the currently desire size.
- A software development framework (e.g., GitOps) commit will be used to set the current desired size for the datastore, using the aforementioned scaling operator In one example implementation, datastores are (e.g., must be) configured for their "large" configuration. A set of requirements around what will trigger cell scaling may then be defined. For example, based on operating a first cell under real workloads, the techniques herein may develop metrics that feed into scaling algorithm for each store. For instance, the topology store team may decide that when they observe EBS IOPS saturation that they must scale their instance types. It may be difficult to predict in advance what these observed indicators of "need to scale up" will be. As such, the techniques herein may be configured to observe the clusters over time, and for each store, create set of observed metrics from which scaling decisions can be made.

Cell capacity may be determined empirically, by performance testing different workloads and setting up tenant capacity and sizing limitation. Service Rate Limiting in cells (described in greater detail below) may be used to define the maximum workload for a cell, despite the cell infrastructure is elastic to a degree, and may scale up to accommodate some spikes in workloads not limited with the service rate limiting.

Regarding Kubernetes (K8s) cluster scaling, in particular, the small, medium, and large sizes of each datastore require progressively larger quantities of resources from the cluster (nodes, volumes, etc.). So, a datastore team, and even a stateless service, cannot plan to "expand" from small to medium without the cluster itself having the resources being requested. Therefore, the techniques herein provide a mechanism for either scaling up the cluster to support the resource needs of the datastores, or having some support for autoscaling on the kubernetes cluster.

Note that the minimum requirements for a Cell k8s cluster may be as follows:

- Each service/data store k8s deployment should define resources requests/limits for each of the cell size
- Each service/data store deployment may define affinity policies and node types (i.e. compute/io optimized)
- Cell k8s cluster should be provisioned with the required resources for each of the cell the size, and different node types if needed.
- Any services which leverage HPA to scale deployments horizontally should limit HPA for the max size For Kubernetes cluster autoscaling, services may be scaling their deployments either vertically (by changing resources requests and resources limits) or horizontally (by leveraging HPA or changing replica count for a deployment). To avoid resources over-provisioning and some way to accommodate resources burst each Cell k8s Cluster should implement Cluster Autoscaler to provision requested resources and provision required k8s cluster node types if needed. W leverage EKS Cluster Autoscaler and HPA to assist with scaling.

Pods autoscaling may either be horizontal or vertical. For horizontal pods autoscaling, most of the stateless services, as well as some datastores, can be scaled horizontally with K8S horizontal pods autoscaling. Service development teams should add HPA definitions to each of the deployments where it makes sense, and K8S cluster autoscaling should provision nodes required to horizontal pods expansion. For vertical pods autoscaling, for datastores, which should be scaled vertically, developers can implement VPA rules in the deployment configuration. However, if any special handling is required to scale the pods vertically, it may need to be implemented using controllers or alternative configuration.

Cell scaling should occur in two cases:
- a cell reaches planned capacity (a tenant about to be provisioned in a cell that reached planned tenant size capacity)
- a cell reaches limitation of data stores—i.e. a datastore, which can't be scaled horizontally started to continuously hit some pre-defined capacity threshold or performance degrades based on metrics.

When a capacity conditions happens, an event should be created in the global event bus to request cell scaling. Cell management service should be subscribed to these events and execute cell modification workflow. Some infrastructural components (like EKS, AMAK, etc. . . . ) may need to be scaled up before datastores and services can be scaled up. In one embodiment, the process to scale up from one cell size to another means switching to a different base size, which should include all the required parameters.

Service Rate Limiting in Cells

The techniques herein extend and/or support the extensibility platform described above by providing service rate limiting in cells.

The goal of rate limiting is twofold:
- To insure that tenants "don't get more than they paid for" (i.e., cannot exceed their plan)
- To insure that tenants can always "get what they paid for" (i.e., are not denied service by "noisy neighbors")

Note that in the present disclosure, the term "rate limiting" is used as a proxy for "resource limiting". Some resources can be allocated/controlled via literal rate limiting at a gateway. However, activities such as queries cause system resource consumption and require other methods besides literal gateway rate limiting for capacity management.

It is important to keep in mind that there is only one valid reason for rate limiting, from a customer's perspective. That is, to keep a customer within their purchased rate limits. It is not acceptable to rate limit a customer when that customer has not exceeded their purchased limits. In other words, it is not acceptable in the SaaS world to tell a customer "we are rate limiting you because someone else is using too much of our SaaS". Nor is it acceptable to tell a customer "we are rate limiting you, but not because you exceeded your agreed upon rates". The concept of rate limiting a customer, and "protecting our resources" must be one and the same, from the moment we design the rate limits. For this reason, it is crucial that purchased plans translate into customer-visible and understood quantities under customer control such as:
- Metrics, Logs/Events, and Traces ingested per minute or per second
- MiB/sec of data ingested per minute MiB/sec of data returned from queries per minute
Number of concurrent UQL queries (this is not actually a "rate" but it works for our purposes)
Number of Metrics, logs/events/and traces returned per second The present disclosure thus discusses what the tenant paid for in terms of "plans": e.g., plan small, plan medium, and plan large. In the present disclosure cells and their sizes are discussed (their statically provisioned capacity): e.g., small, medium, large, XL, XXL, 3XL, 4XL. The techniques herein may illustratively work with a model in which cells hold a maximum of 250 customers. That is, a cell of any size in this implementation will never hold more than 250 customers. In one illustrative embodiment, the techniques herein may further assume a model in which cell capacity doubles at each level. Therefore a "4XL" cell will have 64 times the capacity of our small cell. Keeping in mind that the tenant assignment algorithm can assign our largest customer to a dedicated 4XL cell, this implies that said huge tenant would receive 250*64=16000 times the capacity planned for a single "plan small" tenant. Note that to reduce implementation complexity, a simple model of system scaling may be used in which cells transition upward (and only upward) from small to medium, from medium to large, and so forth.

FIGS. 19A-19D illustrate example graphs 1900*a-d* to help understand the relationship of rate limiting to cell capacity, performance protection, and purchased-plan enforcement. Implementing rate limiting requires deciding what constitutes capacity (capacity being the 'thing' that customers purchase in the purchase plans, and that can be described in terms of a rate). Clearly there are multiple axes of capacity. For example, assume there is a single axis of capacity such as "entities ingested per minute" and that each square in the illustrations (graphs 1900*a-d*) is a unit of capacity. For simplicity, assume that cells hold up to 10 tenants, instead of 250. The Y-axis shows the load normalized so that a single square represents 10% of the total capacity available to a single tenant on the "small sized plan". So, there are 100 squares total in a small cell. A first pattern has been illustrated in squares representing unused/idle capacity. A second pattern has been illustrated in squares representing used capacity, and a third pattern has been illustrated in squares representing capacity that has been "stolen". When capacity is stolen it means that it is not possible for every tenant to simultaneously use their maximum plan. However, capacity stealing is important because it allows for real-life in which some tenants use more than their plan limit, while other tenants use less than their plan limit. Capacity stealing allows a tenant to upgrade their plan, without triggering cell expansion. The sequence of illustrations is designed to show that enforcement of tenant purchased plans and protecting system resources are one and the same activity.

Figure 19A:
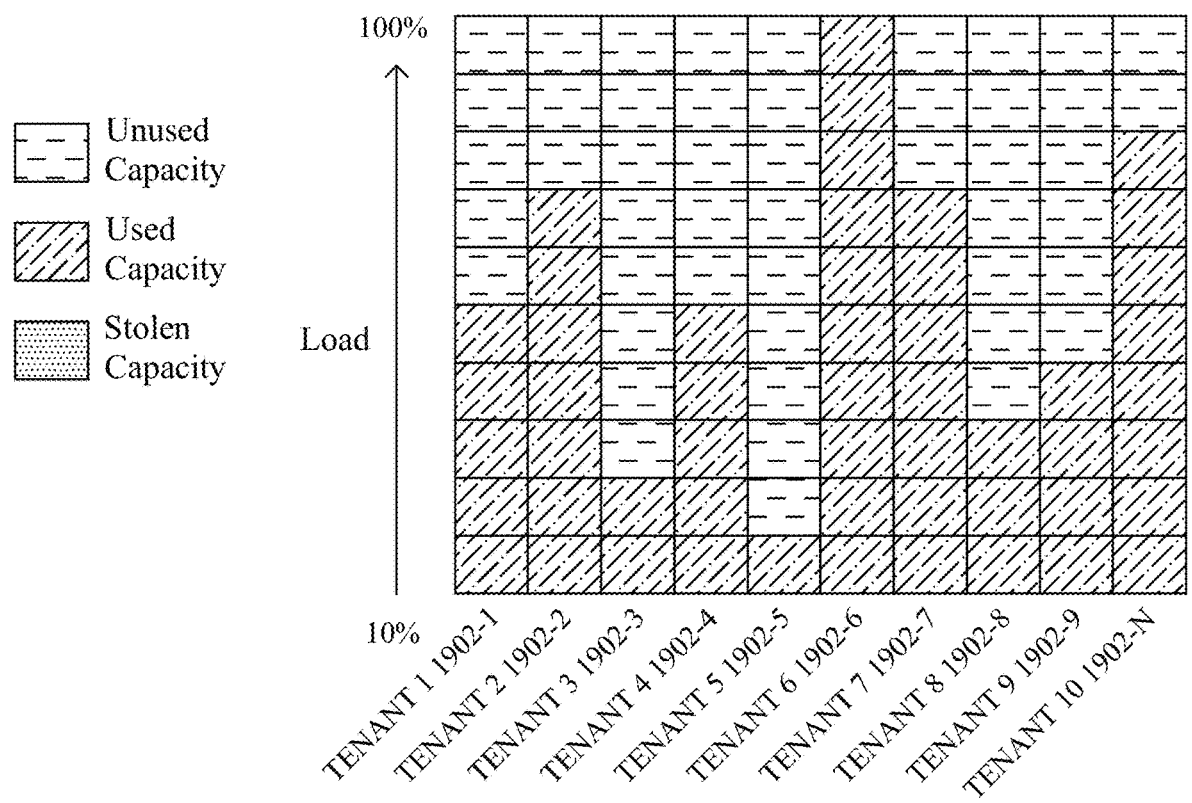
FIGS. 19A-19D illustrate example graphs to help understand the relationship of rate limiting to cell capacity, performance protection, and purchased-plan enforcement.

In FIG. 19A, graph 1900*a* depicts a cell in a "small" configuration. The small cell total capacity (100 units) allows for enough capacity for each of 10 tenants 1902 (e.g., 1902-1 . . . 1902-N) to consume their entire "plan small" capacity (10 units per tenant). Each unit of capacity is illustrated as one square on graph 1900*a*, and this cluster is sized to provide 10 units of capacity to each of 10 small sized plan tenants 1902. If every small sized plan tenant 1902 uses its 10 units of capacity, then the cell will remain healthy and will be 100% utilized. Most of the tenants 1902 are safely within the capacity limits of their "small sized plan". One tenant (tenant 6 1902-6) has reached maximum purchased capacity (e.g., maximum utilization of resources allocated to a small-sized plan), which rate limiting prevents them from exceeding.

Figure 19B:
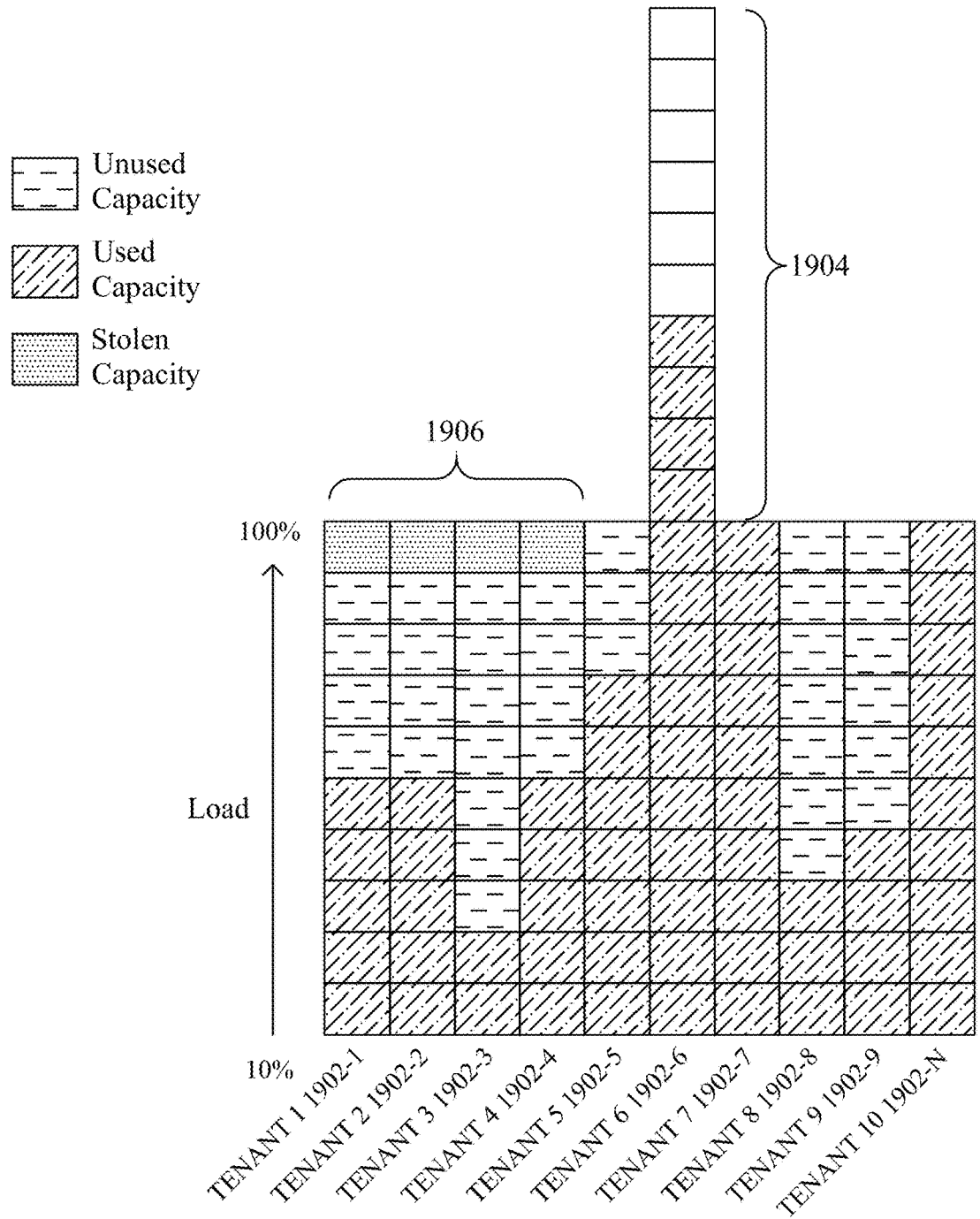

In FIG. 19B, graph 1900*b* depicts one tenant (e.g., tenant 6 1902-6) increasing their plan to "plan medium" to add additional capacity 1904 for its use, and stealing idle capacity (e.g., stolen capacity 1906) from other tenants. When it increases its plan to a medium sized medium, it's rate-limit must be doubled as well so that it is not throttled. It should be clear from this that rate limit enforcement depends on identifying the tenant who is making the request, and knowing their current plan. It should also be clear that it is not always possible to upgrade a tenant plan without increasing cell capacity. In the case, shown in graph 1900*b* the cell had sufficient unused capacity (at least 10 units unused) to allow tenant 6 1902-6 to upgrade to a "medium sized plan". That is, tenant 6 1902-6 has upgraded their plan to a medium sized plan and that additional capacity 1904 is met without increasing the overall cluster capacity. Rather, tenant 6 1902-6 is permitted to steal unused capacity from other tenants. Specifically, the additional capacity 1904 shows that tenant 6 1902-6 has purchased a maximum rate of 20 load units without being rate limited and if tenant 6 1902-6 is rate limited at 20 units then they would have stolen 10 units of idle capacity from other tenants 1902.

In the graphed example, tenant 6 1902-6 has stolen 4 units of unused capacity, one from each of tenant 1 1902-1, tenant 2 1902-2, tenant 3 1920-3, and tenant 4 1902-4. In addition, tenant 10 1902-N is shown as now being rate limited.

Figure 19C:
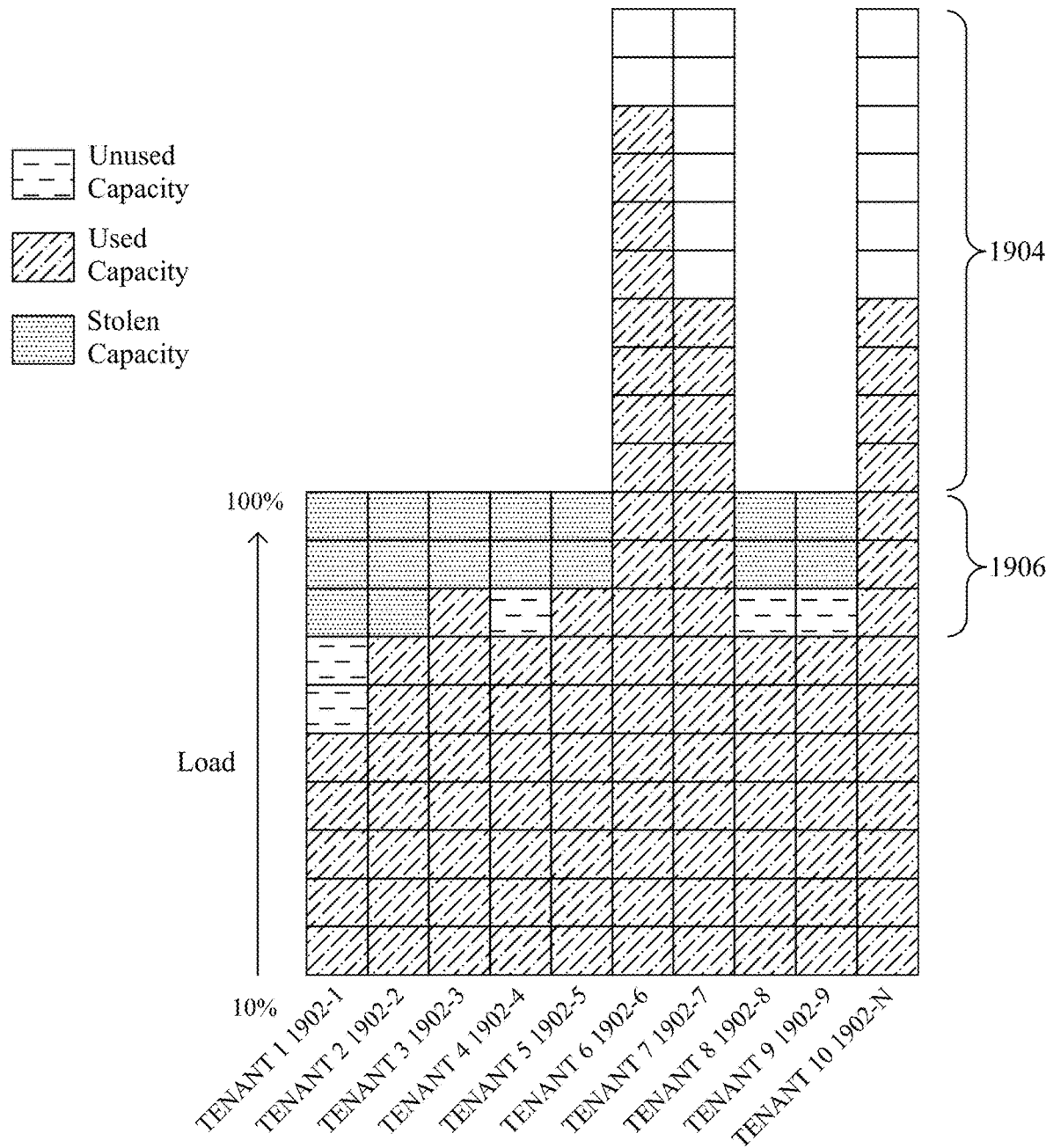

In FIG. 19C, graph 1900*c* depicts a point at which several customers have upgraded plans, and there is so little spare capacity in the cluster that some, or all, tenants may experience problems and errors even though none of them exceeds their purchased plans. This is "the bad place". Databases are getting errors such as EBS IOPS exceeded, and the errors manifest in ways that launch on-call investigations. From this it should be clear that this situation should be avoided by expanding the cluster size preemptively to prevent this situation.

For example, tenant 6 1902-6, tenant 7 1902-7, and tenant 10 1902-N have all upgraded to medium sized plans to provide themselves with ten units of additional capacity 1904 each. In the graphed examples, these tenants 1902 are collective consuming sixteen units of that additional capacity 1904. This translates to sixteen units being stolen from other tenant's capacity (e.g., stolen capacity 1906). When too much capacity is stolen by the upgraded tenants (e.g., tenant 6 1902-6, tenant 7 1902-7, and tenant 10 1902-N), it may threaten to impact neighbors.

Figure 19D:
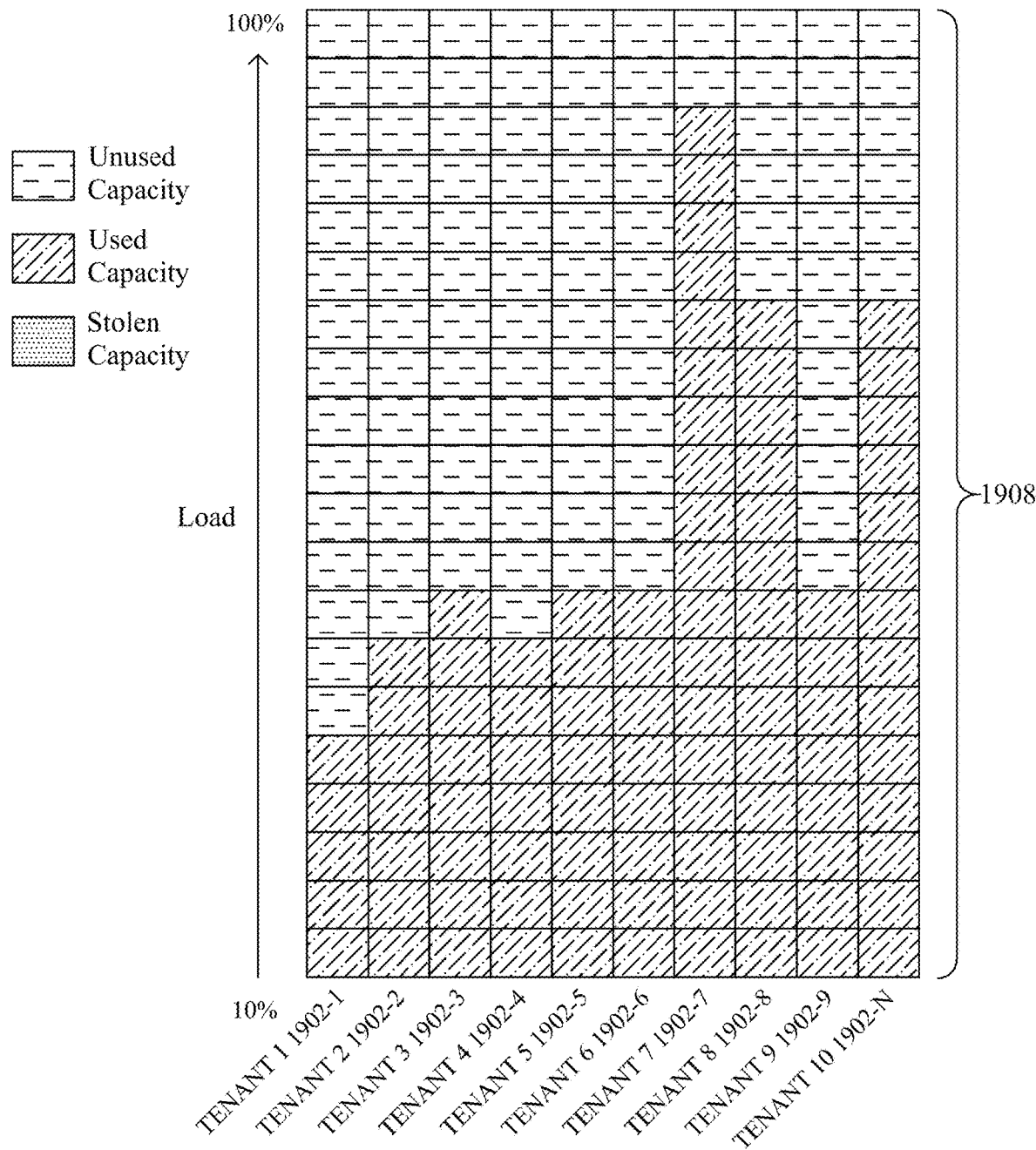

FIG. 19D depicts the doubling of cell capacity 1908 from small to medium. There is spare capacity now, and all tenants 1902 are healthy and no capacity is being stolen by large tenants.

From these examples it should be clear that cell scaling is triggered only by tenant plan buy-up, because without buying up a tenant cannot use more than their planned fraction of capacity.

In one embodiment, one approach to determining which metrics to rate limit on, and the max rates per plan level, will be based on simplicity and will be iterative. In one embodiment, a load generator can inject MELT data into the common ingest and a second load generator can run concurrent query workloads. It can then be determined empirically what ingest rate limits to impose for the "plan small" customer such that 250 tenants can coexist on the small cell. The exercise may go something like this:
1. Agree on a starting point for "plan small" customer rate limits by choosing values for each of:
   a. Events ingested per minute (MiB/min)
   b. Metrics ingested per minute (MiB/min)

c. logs ingested per minute (MiB/min)
d. Traces ingested per minute (MiB/min)
e. Volume of UQL data returned per min (MiB/min)
f. average number of concurrent UQL queries
g. API calls for various tenant facing APIs
   i. call per minute
   ii. count of concurrently "open" API calls
2. Tune all system parameters to insure that the system can run stably with 250 concurrent workloads. Ensure that this "small capacity" cell works properly. If it cannot be, adjust downward the proposed small customer rate limits until the 250 customer benchmark runs stably.
3. Provision and test a medium cell, and benchmark it with 250 concurrent loads that double the load rates of the small benchmark. Verify that the system is able to scale linearly and support twice the ingest rate, with no more than twice the provisioned resources.

Figure 20:
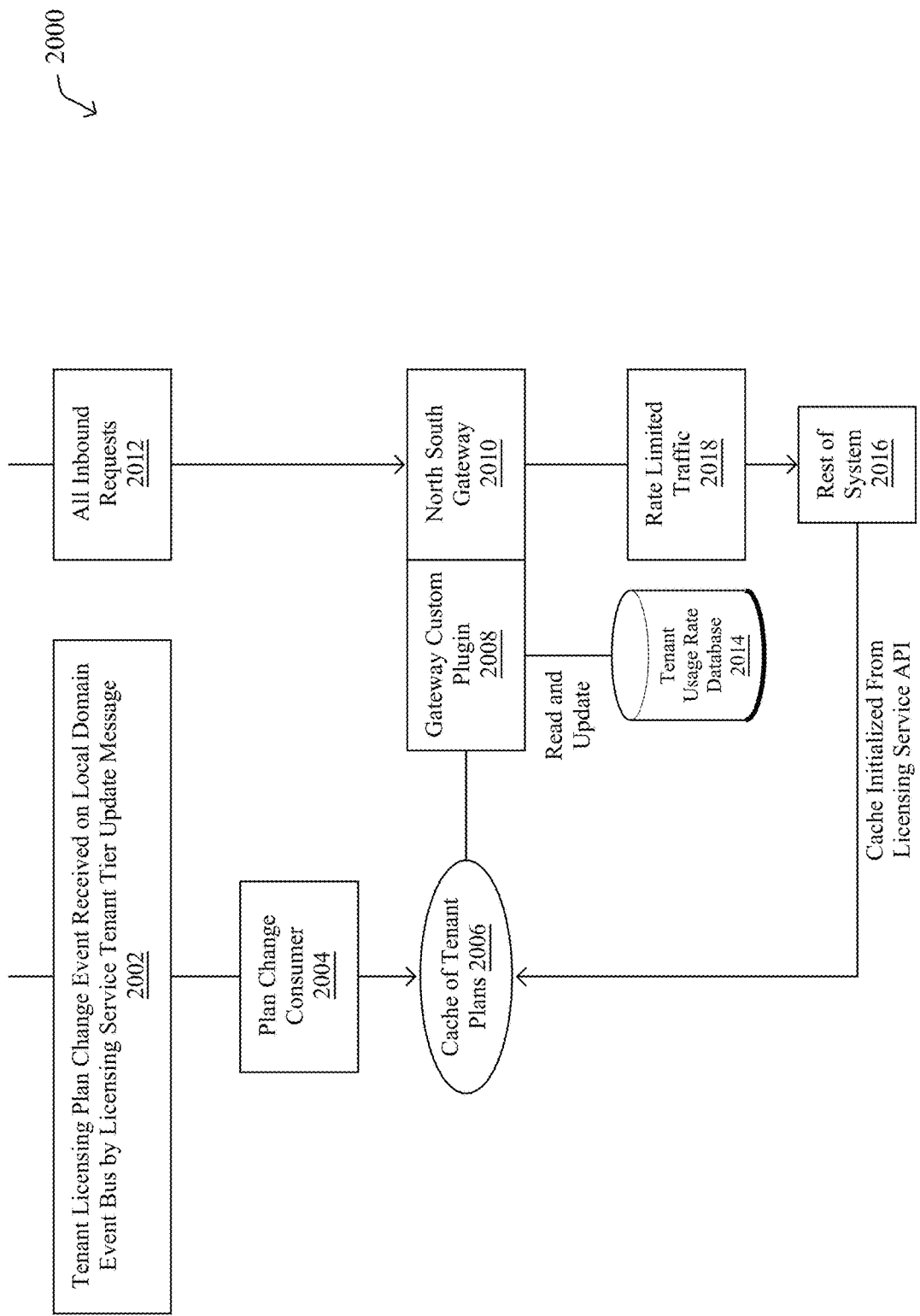
FIG. 20 illustrates an example implementation of enforcing rate limits according to the techniques herein.

According to one or more embodiments of the techniques herein, rate limits may illustratively be enforced by the North-South ingress gateway. An example implementation of enforcing rate limits according to the techniques herein is shown in the example 2000 of FIG. 20. Example 2000 may implement enforcement of rate limits utilizing by receiving tenant licensing plan change events on a local domain event bus be licensing service tenant tier update message 2002. The message 2002 may be consumed by plan change consumer 2004. The changes may be added to a cache of tenant plans 2006. A rate limiter may monitor the in-memory cache of tenant plans 2006 which it uses to determine each rate limit. In example 2000, in inbound request 2012 may be received and/or processed at North South gateway 2010. In addition, gateway custom plugin 2008 may be utilized to read and update a tenant usage rate database 2014. Rate limited traffic 2018 may be sent to the rest of the system 2016. The rest of the system 2016 may utilize a cache initialized from a licensing service API.

This may be the safest way to ensure that no traffic whatsoever enters the system from tenants that have exceeded their plan. Other approaches are more complex, and not as safe. For instance, suppose services are asked to enforce rate limits. By definition, this is asking the system to admit traffic before rate limiting is enforced. It will be hard to predict, let alone guarantee that admitted traffic will have no side effects on system health. Even network usage and SSL encryption and decryption take CPU resources and network bandwidth. This approach may be analogous to securing your home by placing locks on all the bedroom doors. It's far safer and simpler to just lock the front door of the house.

In one embodiment of the present disclosure, the techniques herein may utilize a 'tokens scheme' for enforcing rate limits. For example, tenants may purchase a number of tokens that has a lifespan (e.g., 1 year). There is a static mapping table between tokens and data arriving at the API gateway. For example, with metrics, events, logs, and spans, an example token conversion ratio may be as follows (Resource Name: Token Conversion Ratio):
Metrics: 1
Events: 10
Logs: 0.1
Spans: 1.5

The tokens scheme at first appears to be focused on quantities, not rates.

However, it should be noted that a time period of 1 year is associated with the purchased tokens. Therefore, there is an implicit rate of "tokens per year". However, it must then be determined how to perform rate limiting at useful intervals such as "per hour" or "per minute". In one embodiment of the present disclosure, the techniques herein propose a scheme that combines the consumption of tokens with rate limiting in order protect the system from massive usage spikes while still honoring the token consumption model. In creating this scheme, it is important to consider what the purpose of tokens is, if not to cut the tenant off when there are no more tokens. The very name "token" implies a unit that can be spent. The system is token operated, therefore to operate the system, tokens must be applied, and when they run dry, the tenant is denied access. However, things are not this simple. A tenant should not be allowed to spend all of their tokens in one day, and the system would have to be massively overbuilt to handle this spike. Furthermore, it would not be in the tenant's best interest to use their entire annual token budget over 24 hours. Accordingly, the techniques herein provide a system that actually helps the tenant to ensure that they use their tokens at a rate approximately consistent with their annual budget.

That is, the techniques herein outline a scheme that has the following properties:
1. allows for a reasonable degree of spikes outside of a uniform distribution
2. protects the system from unreasonable sustained spikes
3. protects the tenant from accidentally expending their entire annual budget in a week; one can see scenarios for instance in which a customer brings up many pods and does not realize their logs are all being collected.
4. provides a model that is easy to reason about and explain, both in terms of when alerts are generated, and why they are generated
5. provides the tenant with alerts before any throttling is performed, enabling the tenant to increase their token budget (buy more tokens), or reduce their MELT ingest load (for example by eliminating DEBUG logs that they are sending to our platform)

Figure 21:
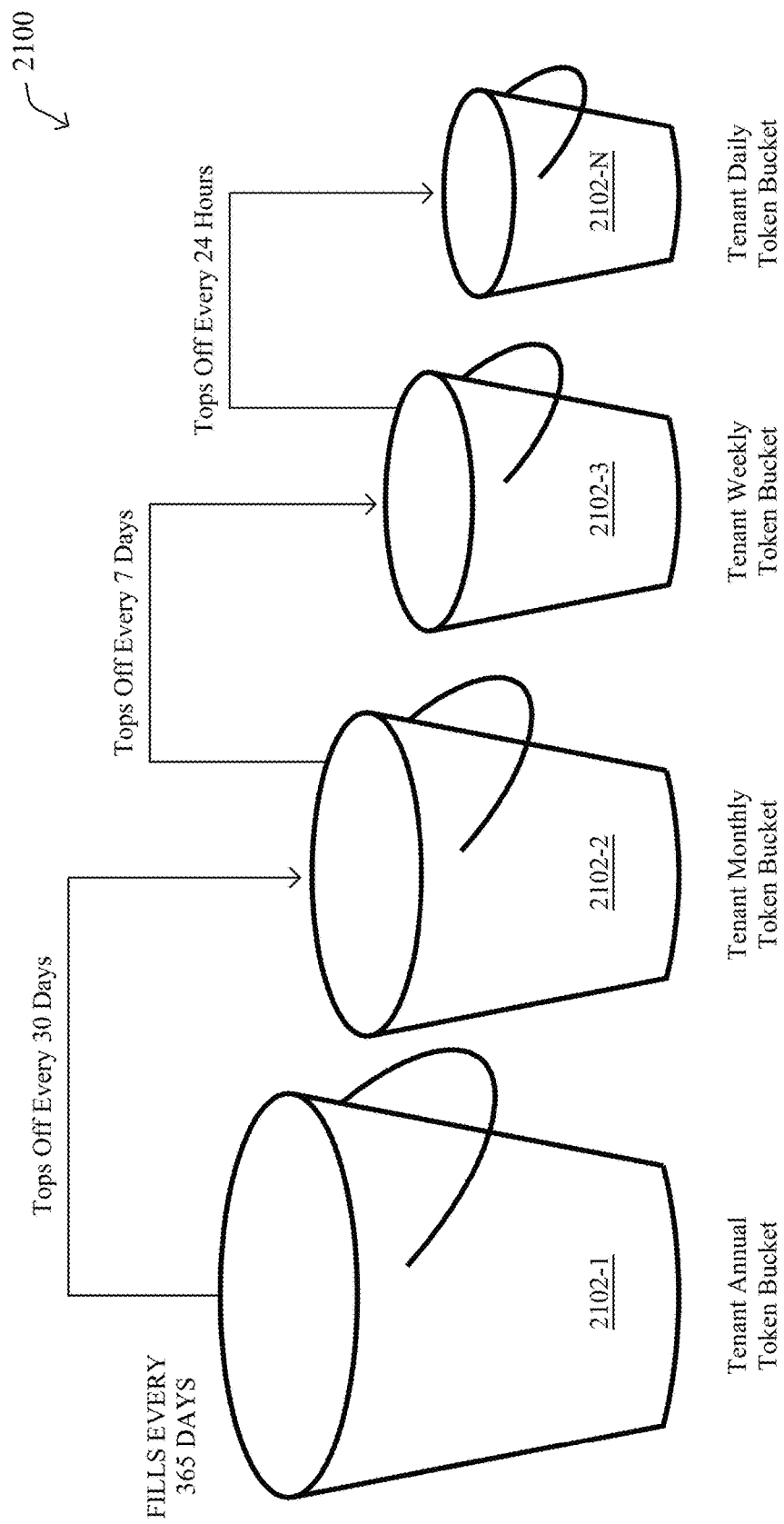
FIG. 21 illustrates an example of a cascade of token buckets.

FIG. 21 illustrates an example 2100 of a cascade of token buckets 2102 (e.g., 2102-1 . . . 2102-N). The scheme is as follows.
1. at plan inception every tenant is allocated an annual token bucket 2102-1, filled with all their tokens
2. at plan inception every tenant is allocated cascading smaller buckets
   a. month bucket 2102-2 ($\frac{1}{12}$ the token count of annual bucket)
   b. week bucket 2102-3 ($\frac{1}{4}$ the token count of month bucket)
   c. day bucket 2012-N ($\frac{1}{7}$ the token count of week bucket)
   d. hour bucket ($\frac{1}{24}$ the token count of day bucket)
3. The token count of each bucket is calculated at inception OR plan reload
4. Each bucket fills from the bucket to its left (except the annual bucket 2102-1 that has no bucket to its left) at plan inception and thereafter at its natural refill period (monthly, weekly, daily, . . . )
5. When a bucket is empty (because all the tokens have been used before its natural refill period has cycled, it generates an ALERT and will refill from its upstream bucket.
   a. this is called an on-demand refill
   b. An on-demand refill indicates that the tenant is using tokens at a rate above the projected uniform distribution for the bucket.
   c. A bucket is allowed 3 on-demand refills within any single natural refill period.

d. If a 4th attempt is made to on-demand refill, the on-demand refill attempt is denied
e. The tenant admin receives warnings of increasing severity each time an on-demand refill is performed. The idea is to give the admin a clear heads-up and advanced warning that their plan is insufficient to meet their needs.
6. The annual bucket 2102-1 can also perform on-demand refills . . . but from where? There is no upstream bucket from the annual bucket 2102-1. The answer may be found in an automated billing system. If the system is setup for auto-reload, then the annual bucket 2102-1 refills anytime it empties. If an auto-reload is not setup, then the game is up and no more traffic is admitted for the tenant.

Certain observations may be made about this scheme:
1. It allows a tenant to use tokens at up to 3 times their projected uniform usage rate over any usage period (month, week, day). It will block off a tenant to prevent more than 3× usage spikes. However, the duration of the blockage is limited to the refill period of the bucket. For instance:
    a. a tenant who uses 3× the daily volume will be blocked, but only until the end of the current day
    b. a tenant who uses 3× the monthly volume will be blocked, but only until the end of the month
2. Tenants are given ample and fair warnings that events (on demand refills) are happening that could lead to temporary blockage
3. It is always clear how long a blockage will last The techniques herein also address controlling system CPU and memory resource consumption caused by queries. For instance, queries typically cause spikier loads than ingest. It is hard to tell, even if you parse a query, what the cost (CPU, mem, network) of executing the query will be. Predicting query cost is the art and science of cost based query optimization, and even state of the art optimizers are not perfect at predicting query performance. Because resource-consumption prediction is difficult, the techniques herein focus instead on terminating queries that use too much resource. The illustrative UQL federates queries to multiple datastores, each with various abilities to predict or report query complexity. This means it is very difficult to figure out exactly which query caused a CPU spike, or how much memory was consumed by a given query. It's especially hard to pin down resource consumption for a given query when the query spans machines and networks. The system herein thus needs some simple measurements that can actually be related back to a specific query so that we can relate the query itself to system load. The techniques herein thus propose:
1. Query Runtime
2. Maximum number of bytes returned from the query "Rank Invariance" means that the system intends to use the data NOT to say "how much RAM was used by the query", but simply to rank the current set of in-progress queries in order of their likely consumption of system resources. As long as the ranking of queries by their q_score is the same (or sufficiently close) to their actual resource consumption then q_score is a rank invariant transformation from actual resource usage and can therefore be used instead of actual resource consumption data. To do this the techniques herein provide a simple tunable q_score that looks like this:

$$q\_score = (*query\_runtime\_ms + *current\_bytes\_returned);$$

where the actual parameters are free and can be tuned to account for the relative importance of either runtime or result size. (Note that the formula presented above is merely an example presented to make the discussion clear-any actual formula can be determined and iterated.)

Regarding resource allocation and protection herein, in the normal course of operation the resource utilization of the query subsystem is "OK". There is no need to kill or preempt queries. When the system utilization is high, a query may need to be selected to be killed. The object is to allow the system to preempt or kill queries when the system does not have the capacity to support all of them, in order to keep system resource utilization in the normal range. No attempt is made to predict how much actual system resource is used by a query. Instead, the actual system resource utilization (memory, CPU) is monitored on the various datastores and UQL engine nodes. When the resource utilization becomes too high, queries must be pre-empted or killed. Figuring out what constitutes "too high" is a related discussion, but also a straightforward determination. For instance, it could be decided that '90% memory utilization on a node is "too high". One can determine these factors by experience, or even consume them as alerts from our own system.

For all active queries the techniques herein may maintain entries in a q_score table, such as shown in FIGS. 22A-22D. The table 2200 (e.g., 2200a-2200d) is updated in real-time by the UQL query execution engine. As can be seen, the table has these columns:

column 1 2202—tenant column 2 2204—plan size is the size of the tenants currently purchased plan column 3 2206—UQL for query (grouped by tenant)

column 4 2208—q_score for the query (given by the formula presented earlier)

column 5 2210—q_pcnt is the percentage of total (across all tenant queries) that a given q_score represents.

column 6 2212—tenant_q_pcnt is the sum of the q_score percentages for each tenant (meaning "tenant A currently holds 11% of the total q_score for the entire system", for instance)

FIGS. 22A-22D thus show several examples of q_score tables 2100a-d, accordingly.

FIG. 22A, in particular, shows table 2200a for Scenario 1: a "Query From Hell". In this scenario one query stands out as much more resource intensive than the others (e.g., query record 2214). But determining whether this is the query that should be killed is not as simply as it may first seem.

FIG. 22B shows table 2200b for Scenario 1: "Death of a thousand queries". In this scenario no query stands out, but collectively the queries have led to too much actual resources being used. Again, determining which query to kill is not so straightforward.

In particular, the determination may involve determine whether the query with the highest q_score be killed. Killing the query may protect the system, but would it is not so clear whether killing that query is fair. If all the tenants are in the same plan_size, then yes, we can pick the query with the highest q_score, kill it, and repeat until the system resource utilization becomes acceptable. However, we must account for the plan_size that the tenant has purchased. For example, if tenant has purchased plan_large, they should be allowed to use twice the system resource of a small tenant. We now present the q_score_scaled which accounts for plan size to allow larger plan tenants to take more system resource.

$$q\_score\_scaled = (\text{*query\_runtime\_ms} + \text{*current\_bytes\_returned})/plan\_size.$$

Plan size is an integer. Plan_small=1, plan_medium=2, plan-large=4, . . . , plan_4×1=64. As can be seen, the larger the plan_size the smaller the q_score_scaled. Now looking at the "Query from Hell" Example, now in FIG. 22C and table 2200c, adding in a seventh column 2216 that adjusts the q_score_scaled based on plan size plan_large (a divisor of 4). The query record 2218 has been identified as showing the query to be killed. It is still the query from hell.

But what happens if tenant_C is plan_size=XL (a divisor of 8)? As can be seen, in FIG. 22D and table 2200d, the "query from hell" (e.g., query record 2218) is no longer the clear candidate to get killed, in fact it is tied with a query from a small tenant (e.g., query record 2220). So, as can be seen, considering the tenant's plan is critically important in deciding which query should be killed.

Accordingly, one cannot predict simply from a query how much query system capacity will be used. Instead, the techniques herein may measure the available system capacity in terms of memory and CPU. When these resources are taxed too heavily, the techniques herein may kill or suspend a query, and repeat until the system is no longer heavily taxed. A simple formula is used to rank candidate queries for killing. The formula is based on things that are easy to measure, like how long a query is running, and how many bytes or rows it is returning. The formula includes taking into account the tenant's plan size so that a notion of fairness is applied; if a large customer's query has the same q_score as a small customer's query, and a query needs to be killed, the customer who pays less will have their query killed when a tie occurs. The techniques herein may keep metric counters on query kills. Occasional query kills are acceptable. Large number of query kills distributed across customers warrant investigation. Perhaps the cluster needs to be expanded to accommodate what appears to be a common query pattern. Large numbers of kills isolated to a single tenant also warrant investigation. Does the tenant need to upgrade their plan? Does field need to reach out to the customer and discuss their workload? Do alerts need to be sent to the customer? Do we need to put absolute bounds on query execution time? For instance cap all queries at 5s execution time? How about capping maximum result set rows? We do not answer all these questions here, but a framework has been presented that will prevent customers from overloading the system.

Figure 23:
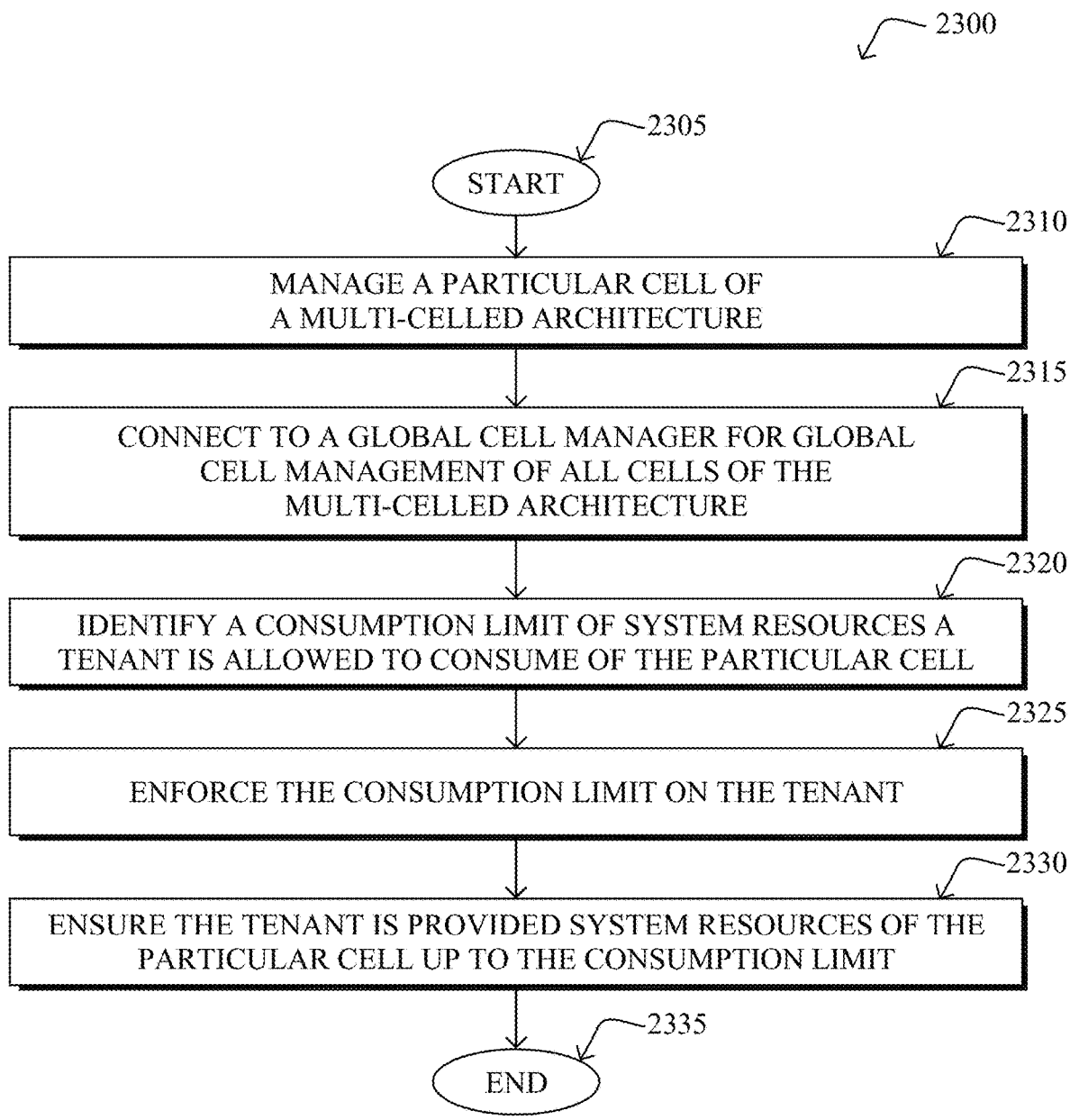
FIG. 23 illustrates an example simplified procedure for utilizing a cell-based architecture for an extensibility platform, in accordance with one or more embodiments described herein.

In closing, FIG. 23 illustrates an example simplified procedure for utilizing a cell-based architecture for an extensibility platform in accordance with one or more embodiments described herein, particularly from the perspective of a cell controller. For example, a non-generic, specifically configured device (e.g., device 200) may perform procedure 2300 by executing stored instructions (e.g., extensibility platform process 248). The procedure 2300 may start at step 2305, and continues to step 2310, where, as described in greater detail above, a cell controller may manage a particular cell of a multi-celled architecture for an extensibility platform having one or more tenants served by datastores of the particular cell.

At step 2315, as detailed above, the cell controller may connect to a global cell manager for global cell management of all cells of the multi-celled architecture. The particular cell may be originally provisioned by the global cell manager with minimum system resources. In addition, tenant assignments may be received from the global cell manager. Further, cell expansion of the particular cell may be requested from the global cell manager. Requesting the cell expansion may be based on one of either reaching a threshold capacity or a maximum capability of the particular cell. Connecting to the global cell manager may be based on a domain event topic.

As noted above, at step 2320, the cell controller may identify a consumption limit indicating a maximum amount of system resources that a particular tenant of the one or more tenants is allowed to consume of the particular cell. In some examples, the consumption limit may be based on one or both of amounts or percentages of resource utilization. In various embodiments, system resources may be selected from a group consisting of: storage capacity; compute capacity; number of queries; queries per time period; amount of data stored per time period; amount of data returned per time period; and number of entries of data per time period. The maximum amount of system resources that the particular tenant of the one or more tenants is allowed to consume of the particular cell may comprise service rate limits on ingest.

Further to the detailed discussion above, at step 2325, the cell controller may enforce the consumption limit on the particular tenant. Enforcing may be based on a token-based schedule with a number of tokens granted to the particular tenant for a given time period.

At step 2330, as detailed above, the cell controller may ensure that the particular tenant is provided system resources of the particular cell up to the consumption limit without limitation. In various embodiments, the cell controller may expand the particular cell by increasing datastores and message busses of the particular cell. In some instances, a request may be received from the global cell manager to expand. Further, the cell controller may rebalance datastores of the particular cell after expanding.

Expanding the particular cell may be based on one or both of horizontal scaling or vertical scaling. Additionally, expanding may be based on selecting from a plurality of tiers of consumption limits and corresponding datastores and message busses. In some instances, expanding may be based on configuring the particular cell for a particular tier of the plurality of tiers. In various embodiments, a corresponding consumption limit of each tier may double that of a previous tier of the plurality of tiers.

The simplified procedure 2300 may then end in step 2335, notably with the ability to continue managing the particular cell and additional cells including by identifying and enforcing new consumption limits. Other steps may also be included generally within procedure 2300.

It should be noted that while certain steps within procedure 2300 may be optional as described above, the steps shown in FIG. 23 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a cell-based architecture for an extensibility platform. In particular, the techniques herein are directed toward subdividing regions into cells. In a cell architecture, the "entire system" (modulo global elements) is stamped out many times in a given region, where cells are totally isolated from each other (no network connectivity between cells). Cells limit blast radius (number of tenants per cell affected by a problem), provide predictable capacity and scalability requirements, and create dedicated environments for bigger customers. A cell architecture effectively enjoys repeatable deployment and software development frameworks (e.g., via GitOps), by virtue of the fact that even within a region hundreds of cells are stamped out. The techniques herein also address service rate limiting in cells for the extensibility platform.

Illustratively, the techniques described herein may be performed by hardware, software, and/or firmware, such as in accordance with the illustrative extensibility platform process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: managing, by a cell controller, a particular cell of a multi-celled architecture for an extensibility platform having one or more tenants served by datastores of the particular cell; connecting, by a cell controller, to a global cell manager for global cell management of all cells of the multi-celled architecture; identifying, by the cell controller, a consumption limit indicating a maximum amount of system resources that a particular tenant of the one or more tenants is allowed to consume of the particular cell; enforcing, by the cell controller, the consumption limit on the particular tenant; and ensuring, by the cell controller, that the particular tenant is provided system resources of the particular cell up to the consumption limit without limitation.

In one embodiment, the method further comprises expanding the particular cell by increasing datastores and message busses of the particular cell. In one embodiment, the method further comprises receiving a request from the global cell manager to expand. In one embodiment, the method further comprises rebalancing datastores of the particular cell after expanding. In one embodiment, expanding is based on one or both of horizontal scaling or vertical scaling. In one embodiment, expanding is based on selecting from a plurality of tiers of consumption limits and corresponding datastores and message busses. In one embodiment, expanding is based on configuring the particular cell for a particular tier of the plurality of tiers. In one embodiment, a corresponding consumption limit of each tier doubles that of a previous tier of the plurality of tiers.

In one embodiment, the consumption limit is based on one or both of amounts or percentages of resource utilization. In one embodiment, system resources are selected from a group consisting of: storage capacity; compute capacity; number of queries; queries per time period; amount of data stored per time period; amount of data returned per time period; and number of entries of data per time period. In one embodiment, the maximum amount of system resources that the particular tenant of the one or more tenants is allowed to consume of the particular cell comprises service rate limits on ingest. In one embodiment, the method further comprises receiving tenant assignments from the global cell manager. In one embodiment, the method further comprises requesting, from the global cell manager, cell expansion of the particular cell. In one embodiment, requesting cell expansion is based on one of either reaching a threshold capacity or a maximum capability of the particular cell. In one embodiment, enforcing is based on a token-based sched with a number of tokens granted to the particular tenant for a given time period. In one embodiment, connecting to the global cell manager is based on a domain event topic. In one embodiment, the particular cell is originally provisioned by the global cell manager with minimum system resources.

According to the embodiments herein, an illustrative tangible, non-transitory, computer-readable medium herein may have computer-executable instructions stored thereon that, when executed by a processor on a computer, may cause the computer to perform a cell controller process comprising: managing a particular cell of a multi-celled architecture for an extensibility platform having one or more tenants served by datastores of the particular cell; connecting to a global cell manager for global cell management of all cells of the multi-celled architecture; identifying a consumption limit indicating a maximum amount of system resources that a particular tenant of the one or more tenants is allowed to consume of the particular cell; enforcing the consumption limit on the particular tenant; and ensuring that the particular tenant is provided system resources of the particular cell up to the consumption limit without limitation.

Further, according to the embodiments herein an illustrative apparatus herein may comprise: one or more network interfaces to communicate with a network; a processor coupled to the network interfaces and configured to execute one or more processes; and a memory configured to store a cell controller process that is executable by the processor, the cell controller process, when executed, configured to: manage a particular cell of a multi-celled architecture for an extensibility platform having one or more tenants served by datastores of the particular cell; connect to a global cell manager for global cell management of all cells of the multi-celled architecture; identify a consumption limit indicating a maximum amount of system resources that a particular tenant of the one or more tenants is allowed to consume of the particular cell; enforce the consumption limit on the particular tenant; and ensure that the particular tenant is provided system resources of the particular cell up to the consumption limit without limitation.

While there have been shown and described illustrative embodiments above, it is to be understood that various other adaptations and modifications may be made within the scope of the embodiments herein. For example, while certain embodiments are described herein with respect to certain types of applications in particular, such as the observability intelligence platform, the techniques are not limited as such and may be used with any computer application, generally, in other embodiments. For example, as opposed to observability and/or telemetry data, particularly as related to computer networks and associated metrics (e.g., pathways, utilizations, etc.), other application platforms may also utilize the general extensibility platform described herein, such as for other types of data-based user interfaces, other types of data ingestion and aggregation, and so on, may also benefit from the extensibility platform described herein.

Moreover, while specific technologies, languages, protocols, and associated devices have been shown, such as Java, TCP, IP, and so on, other suitable technologies, languages, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    determining, by a process, one or more specific regions where one or more tenants are to be serviced by a multi-celled architecture for an extensibility platform, the one or more tenants to be served by datastores of one or more particular cells of the multi-celled architecture;
    provisioning, by the process and within the one or more specific regions and for the one or more tenants, individual cells of the multi-celled architecture with a local copy of global layer system components for cell functionality;
    maintaining, by the process, a solution repository that has a plurality of solutions and corresponding artifacts, wherein the one or more tenants may subscribe to one or more particular solutions of the plurality of solutions; and
    enabling, by the process, each respective cell of the individual cells of the multi-celled architecture to pull, from the solution repository, a given solution of the one or more particular solutions to which a particular tenant of the one or more tenants has subscribed when the given solution is not already present in that respective cell.

2. The method as in claim 1, further comprising:
    deploying a new cell within a new specific region where the one or more tenants are to be serviced by the multi-celled architecture.

3. The method as in claim 2, further comprising:
    listening for an event on a service bus of the multi-celled architecture to trigger deploying of the new cell for the new specific region.

4. The method as in claim 1, further comprising:
    provisioning a global cell of the multi-celled architecture for control of the one or more particular cells of the multi-celled architecture.

5. The method as in claim 4, wherein the one or more particular cells communicate only with the global cell to receive commands and control from the global cell and do not communicate with other cells of the one or more particular cells.

6. The method as in claim 1, further comprising:
    scaling the multi-celled architecture for the extensibility platform by provisioning additional cells for the one or more tenants.

7. The method as in claim 1, further comprising:
    scaling the multi-celled architecture for the extensibility platform by expanding one or more given cells of the one or more particular cells.

8. The method as in claim 7, further comprising:
    expanding the one or more given cells by increasing datastores and message busses of the one or more given cells.

9. The method as in claim 7, further comprising:
    rebalancing datastores of the one or more given cells after expanding.

10. The method as in claim 7, wherein expanding is based on selecting from a plurality of tiers of consumption limits and corresponding datastores and message busses.

11. The method as in claim 1, further comprising:
scaling the multi-celled architecture for the extensibility platform in response to provisioning a new tenant into one of the one or more particular cells that has reached a planned tenant capacity.

12. The method as in claim 1, further comprising:
scaling the multi-celled architecture for the extensibility platform in response to reaching a data store limitation of one or more of the one or more particular cells.

13. The method as in claim 1, further comprising:
identifying a consumption limit indicating a maximum amount of system resources that a particular tenant of the one or more tenants is allowed to consume of a particular cell of the one or more particular cells;
enforcing the consumption limit on the particular tenant; and
ensuring that the particular tenant is provided system resources of the particular cell up to the consumption limit without limitation.

14. The method as in claim 13, wherein the consumption limit is based on one or both of amounts or percentages of resource utilization.

15. The method as in claim 13, wherein the system resources are selected from a group consisting of: storage capacity; compute capacity; number of queries; queries per time period; amount of data stored per time period; amount of data returned per time period; and number of entries of data per time period.

16. The method as in claim 1, further comprising:
assigning the one or more tenants to the one or more particular cells of the multi-celled architecture.

17. The method as in claim 1, wherein the individual cells are originally provisioned with minimum system resources needed to enable pull-based deployment of the individual cells.

18. A tangible, non-transitory, computer-readable medium having computer-executable instructions stored thereon that, when executed by a processor on a computer, cause the computer to perform a process comprising:
determining one or more specific regions where one or more tenants are to be serviced by a multi-celled architecture for an extensibility platform, the one or more tenants to be served by datastores of one or more particular cells of the multi-celled architecture;
provisioning, within the one or more specific regions and for the one or more tenants, individual cells of the multi-celled architecture with a local copy of global layer system components for cell functionality;
maintaining a solution repository that has a plurality of solutions and corresponding artifacts, wherein the one or more tenants may subscribe to one or more particular solutions of the plurality of solutions; and
enabling each respective cell of the individual cells of the multi-celled architecture to pull, from the solution repository, a given solution of the one or more particular solutions to which a particular tenant of the one or more tenants has subscribed when the given solution is not already present in that respective cell.

19. The tangible, non-transitory, computer-readable medium as in claim 18, wherein the process further comprises:
deploying a new cell within a new specific region where the one or more tenants are to be serviced by the multi-celled architecture.

20. An apparatus, comprising:
one or more network interfaces to communicate with a network;
a processor coupled to the one or more network interfaces and configured to execute one or more processes; and
a memory configured to store a process that is executable by the processor, the process, when executed, configured to:
determine one or more specific regions where one or more tenants are to be serviced by a multi-celled architecture for an extensibility platform, the one or more tenants to be served by datastores of one or more particular cells of the multi-celled architecture;
provision, within the one or more specific regions and for the one or more tenants, individual cells of the multi-celled architecture with a local copy of global layer system components for cell functionality;
maintain a solution repository that has a plurality of solutions and corresponding artifacts, wherein the one or more tenants may subscribe to one or more particular solutions of the plurality of solutions; and
enable each respective cell of the individual cells of the multi-celled architecture to pull, from the solution repository, a given solution of the one or more particular solutions to which a particular tenant of the one or more tenants has subscribed when the given solution is not already present in that respective cell.

* * * * *